United States Patent
Okumura et al.

(10) Patent No.: US 8,210,732 B2
(45) Date of Patent: Jul. 3, 2012

(54) LIGHT GUIDE PLATE, LIGHT GUIDE PLATE ASSEMBLY, AND PLANAR LIGHTING DEVICE AND LIQUID CRYSTAL DISPLAY DEVICE USING THESE

(75) Inventors: Takamitsu Okumura, Kanagawa (JP); Toshiaki Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 642 days.

(21) Appl. No.: 12/305,175

(22) PCT Filed: Jun. 13, 2007

(86) PCT No.: PCT/JP2007/061902
§ 371 (c)(1),
(2), (4) Date: May 6, 2009

(87) PCT Pub. No.: WO2007/145248
PCT Pub. Date: Dec. 21, 2007

(65) Prior Publication Data
US 2009/0316072 A1    Dec. 24, 2009

(30) Foreign Application Priority Data

Jun. 16, 2006 (JP) .................................. 2006-167926
Jun. 16, 2006 (JP) .................................. 2006-167965

(51) Int. Cl.
*F21V 7/04* (2006.01)
(52) U.S. Cl. .......................... 362/628; 362/607; 362/613
(58) Field of Classification Search .................. 362/602, 362/606, 607, 612, 613, 614, 615, 623, 625, 362/628, 330
See application file for complete search history.

(56) References Cited

U.S. PATENT DOCUMENTS

| | | | | |
|---|---|---|---|---|
| 2002/0030984 A1* | 3/2002 | Ohkawa | ........................ | 362/31 |
| 2005/0201706 A1 | 9/2005 | Iwasaki | | |
| 2008/0123350 A1* | 5/2008 | Choe et al. | .................... | 362/330 |
| 2011/0085351 A1* | 4/2011 | Pijlman et al. | ................ | 362/607 |

FOREIGN PATENT DOCUMENTS

| | | |
|---|---|---|
| JP | 8-248420 A | 9/1996 |
| JP | 8-271739 A | 10/1996 |
| JP | 11-7014 A | 1/1999 |
| JP | 11-84379 A | 3/1999 |
| JP | 2001-92370 A | 4/2001 |
| JP | 2004-38108 A | 2/2004 |
| JP | 2004-186124 A | 7/2004 |
| JP | 2005-215171 A | 8/2005 |

OTHER PUBLICATIONS

International Preliminary Report on Patentability and Written Opinion, dated Dec. 31, 2008, issued in corresponding application PCT/JP2007/061902, 8 pages.

* cited by examiner

*Primary Examiner* — Y My Quach Lee
(74) *Attorney, Agent, or Firm* — Sughrue Mion, PLLC

(57) ABSTRACT

A light guide plate includes a light exit plane and a light entrance end, is formed into a shape having a thickness in a direction orthogonal to the light exit plane, the thickness being gradually larger as being farther from the light entrance end, and contains scattering particles dispersed therein, and a light guide plate assembly includes the light guide plate and a prism sheet which includes a plurality of prisms arrayed in parallel with each other, and is arranged so that vertex angles of the prisms face the light exit plane. The scattering particles scatter light entering from the light entrance end and propagating in the light guide plate, which satisfy Expressions (1) and (2) below, and vertex angles of the prisms of the prism sheet satisfy Expression (3) and (4) below.

$$1.1 \leq \Phi N_P L_G K_C \leq 8.2 \quad (1)$$

$$0.005 \leq K_C \leq 0.1 \quad (2)$$

$$55° \leq \theta \leq 80° \quad (3)$$

$$0° \leq \theta_1 \leq 15° \text{ and } 30° \leq \theta_2 \leq 45° \quad (4)$$

24 Claims, 17 Drawing Sheets

LIGHT GUIDE PLATE, LIGHT GUIDE PLATE ASSEMBLY, AND PLANAR LIGHTING DEVICE AND LIQUID CRYSTAL DISPLAY DEVICE USING THESE

TECHNICAL FIELD

The present invention relates to a light guide plate for converting a light of a light source such as a point-like light source or a linear light source into a planar light, a light guide plate assembly for diffusing a light emitted from the light source to emit an illumination light from a light exit plane, and a planar lighting device and a liquid crystal display device using these. More specifically, the present invention relates to a light guide plate for emitting a uniform planar illumination light of a large lighting area, a light guide plate assembly capable of maximizing light use efficiency and front brightness, a planar lighting device having a large lighting area and high in-plane uniformity for indoor and outdoor lighting, or a planar lighting device used as a backlight for a liquid crystal display panel of a liquid crystal display device, an advertisement panel an advertisement tower, or a billboard, and a large-screen liquid crystal display device using the light guide plate and the light guide plate assembly.

BACKGROUND ART

In a liquid crystal display device or a planar light emitting device, a fluorescent tube such as a cold cathode tube or a hot cathode tube bas been used as a light source. For example, in a liquid crystal display device such as a liquid crystal television or a liquid crystal monitor, a planar lighting device, i.e., a backlight unit (hereinafter, also referred to as BLU), is used for emitting an illumination light from a backside of a liquid crystal display panel to light the liquid crystal display panel.

At present, the light source portion of the liquid crystal display device, i.e., the backlight unit, adopts a method called a direct type which includes a liquid crystal display panel (light diffusion plate) disposed directly above a light source for lighting in most instances. For the light source of the BLU of this method, usually, a fluorescent tube such as a cold cathode tube or a hot cathode tube is used. For example, in this method, a plurality of fluorescent tubes which are light sources are arranged on the backside of the liquid crystal display panel to secure a uniform light-amount distribution and necessary brightness with the inside set as a white reflection plane.

However, in the BLU of the direct type, a direct light from the fluorescent tubes is converted into a uniform planar light source, and thus there is a problem in that a certain thickness for suppressing nonuniformity of brightness (brightness unevenness) needs to be secured, in other words, there is a limit to thinning thereof.

On the other hand, as a method for realizing a BLU thinner than the BLU of the direct method, there is known a light guide plate method (also referred to as sidelight type or method), in which a light from a light source is converted into a planar light by using a transparent resin flat plate called a light guide plate. As described above, the backlight unit of the sidelight method using the light guide plate is configured by a light source such as a fluorescent tube for lighting, a light guide plate for causing a light emitted from the light source to enter through its end plane, and diffusing and reflecting the light therein to emit a planar light from a light exit plane, and a component such as a prism sheet or a diffusion sheet for uniforming the light emitted from this light guide plate to illuminate the liquid crystal display panel. According to this method, a light is caused to enter through the lateral face (end plane) of the light guide plate, and guided in the light guide plate to emit a planar illumination light from a top or bottom surface which is larger than the lateral plane.

This method, in other words, the BLU of the sidelight method, is capable of being made thinner than the backlight unit of the direct method, because it has a function of emitting the light entering from the end plane while the light guide plate guides the light.

In the conventional BLU of the sidelight type, the light entering through its lateral end plane has to be scattered in a direction substantially orthogonal to an advancing direction to be emitted from the light exit plane. Thus, a light guide plate of a flat plate type or a tapered type (hereinafter, referred to as wedge shape) having a thickness reduced in the light advancing direction, a tandem light guide plate having wedge-shaped light guide plates sequentially combined, or a light guide plate of a bridge type in which thick portions of wedge-shaped light guide plates are combined together in other words, a sidelight type, is used.

Further, there is proposed a backlight unit of a conventional sidelight method that uses a wedge-shaped light guide plate containing scattering particles mixed in a transparent resin to scatter a light (e.g., refer to Patent Document 1).

In a planar light source device disclosed in Patent Document 1, a light emitted from a fluorescent lamp is caused to enter to a wedge-shaped light guide body containing scattering particles of different refractive indices and extremely small particle diameters uniformly scattered therein. The light that has advanced in the light guide body after the entrance is reflected by an inclined backside of the light guide body and a reflector disposed therein to be emitted from a light extraction plane of the light guide body. At the same time, the light advancing in the light guide body is emitted from the light extraction plane of the light guide body by scattering action of the scattering particles.

Recently, a light emitting diode (LED) has been used as a light source in place of the fluorescent tube. This is because the LED has a feature and an advantage of using no mercury that is essential to the fluorescent tube and a possibility of higher emission efficiency compared with the fluorescent tube. There is also proposed a light guide plate technology that uses the LED as a light source, i.e., a planar lighting device (backlight unit) technology (refer to Patent Documents 2 to 4).

Patent Document 2 discloses a lighting device which uses a light emitting diode (LED) as a point-like light source, disposed in an end plane of a flat-plate light guide plate. Patent Document 3 discloses a liquid crystal display device which includes light emitting elements such as LEDs for backlight light sources disposed in one of a pair of opposing transparent substrates forming a liquid crystal panel. Patent Document 4 discloses a backlight which includes a white LED disposed in the end of a light guide plate formed of a plurality of blocks.

Patent Document 1: JP 08-271739 A
Patent Document 2: JP 11-007014 A
Patent Document 3: JP 08-248420 A
Patent Document 4: JP 2001-092370 A

DISCLOSURE OF THE INVENTION

Problems to be Solved by the Invention

The technology of the light guide plate of the sidelight method using the fluorescent tube or the planar lighting device (backlight unit) using the light guide plate has the following problems.

First, because a light from the light source is caused to enter through the lateral end plane of the light guide plate side, there is a limit to the amount of incoming light, leading to a difficulty in obtaining an illumination light of high brightness.

Second, a currently available fluorescent tube has an outer diameter of about 2.0 mm at the minimum, leading to a difficulty in setting a thickness of the light guide plate smaller than the outer diameter of the fluorescent tube. In consequence, it is difficult to thin the light guide plate further. Thus, there is a limit to thinning of the backlight unit.

In the planar light source device using the light guide plate described in Patent Document 1, for enlarging the light guide plate, it is necessary that a light be caused to reach a farther position from the light source. For this purpose, a thickness of the light guide plate itself has to be made large. In other words, there is a problem in that the planar lighting device cannot be thinned or reduced in weight.

Recently, a thin and large-screen liquid crystal display device has been actively developed. In order to manufacture a thin and large-screen liquid crystal display device, a planar lighting device such as a BLU is required to be made thin and large. However, as in the cases of Patent Documents 2, 3, and 4, generally, the technology for the light guide plate using an LED as a light source or a planar lighting device such as a BLU of a light guide plate method has a difficulty in thinning and enlargement because of the following causes and problems in addition to the problem of the BLU of the light guide plate method using the fluorescent tube.

First, there is a limit to a light guide length of the flat plate or wedge-shaped light guide plate of the sidelight method. Thus, sufficient in-plane uniformity of exit plane brightness or emission plane brightness cannot be achieved.

Second, in the light guide plate of the sidelight method which is a conventional technology, even when light from a light source enters through a lateral end plane of one side or lateral end planes of both sides, a limit of an LED arranging pitch or an emission density (lm/m$^2$) imposes a limit on the amount of incoming light.

The present invention has been made to solve the above-mentioned problems. A first object of the present invention is to provide a light guide plate assembly which solves the above-mentioned problems of the prior art, is thin and light, can emit a uniform illumination light of no brightness unevenness, can be enlarged, can increase efficiency of extracting an incoming light from a light guide plate (light use efficiency), and can maximize front-direction brightness (front brightness) of a light exit plane to enhance the front brightness.

A second object of the present invention is to provide, in addition to the first object, a planar lighting device which is thin and light, can emit a uniform and large-area planar illumination light having no or almost no brightness unevenness, can be enlarged, and has high light use efficiency and high front brightness.

A third object of the present invention is to provide a light, thin, and large light guide plate which can emit a planar light having almost no brightness unevenness with high emission efficiency.

A fourth object of the present invention is to provide a light, thin, and large planar lighting device which can emit a large-area planar illumination light having almost no brightness unevenness.

A fifth object of the present invention is to provide a light, thin, and large-display-area liquid crystal display device.

Means to Solve the Problems

In order to attain the first object described above, a first aspect of the present invention provides a light guide plate assembly, comprising: a light guide plate which includes a light exit plane for emitting a planar light and a light entrance end disposed in one end of the light exit plane and substantially orthogonal to the light exit plane, is formed into a shape having a thickness in a direction orthogonal to the light exit plane, the thickness being gradually larger as being farther from the light entrance end, and contains scattering particles dispersed therein; and a prism sheet which includes a plurality of prisms arrayed in parallel with each other, and is arranged so that vertex angles of the plurality of prisms face the light exit plane of the light guide plate, wherein: the scattering particles scatter light entering from the light entrance end and propagating in the light guide plate, which satisfy Expressions (1) and (2) below; when lengths of two straight lines sandwiching each of the vertex angles of the plurality of prisms of the prism sheet are equal to each other, an angle formed between the two straight lines of the equal lengths satisfies Expression (3) below; and when the lengths of the two straight lines sandwiching the each of the vertex angles of the plurality of prisms are different from each other, an angle formed between the straight lines of the different lengths satisfies Expression (4) below, $$1.1 \leq \Phi N_P L_G K_C \leq 8.2 \tag{1}$$

$$0.005 \leq K_C \leq 0.1 \tag{2}$$

$$55° \leq \theta \leq 80° \tag{3}$$

$$0° \leq \theta_1 \leq 15° \text{ and } 30° \leq \theta_2 \leq 45° \tag{4}$$

in Expressions (1) and (2), $\Phi$ represents a scattering cross section [m$^2$] of the scattering particles, $N_P$ represents a density [pieces/m$^2$] of the scattering particles, $L_G$[m] represents a length extending from the light entrance end to a thickest part of the light guide plate in an entrance direction, and $K_C$ represents a compensation coefficient, in Expression (3), $\theta$ represents the angle formed between the two straight lines of the equal lengths, and in Expression (4), $\theta_1$ represents an angle formed between a perpendicular from a vertex of each of the vertex angles of the plurality of prisms with respect to a bottom of each of the plurality of prisms and one of the straight lines of the different lengths, and $\theta_2$ represents an angle formed between the perpendicular and another of the straight lines of the different lengths.

Preferably, the light exit plane of the light guide plate is rectangular; the light entrance end comprises two light entrance planes substantially orthogonal to the light exit plane in two opposing sides of the rectangular light exit plane; and the light guide plate is formed into a shape having a maximum thickness on a center line of the two opposing sides of the rectangular light exit plane.

Or, preferably, the light exit plane of the light guide plate is rectangular; the light entrance end comprises four light entrance planes substantially orthogonal to the light exit plane in four opposing sides of the rectangular light exit plane; and the light guide plate is formed into a pyramidal shape having a maximum thickness on a center of the four opposing sides of the rectangular light exit plane.

And, preferably, the vertex angles of the plurality of prisms of the prism sheet are determined according to a concentration of the scattering particles contained in the light guide plate.

In addition, it is preferable that the light guide plate assembly according to the first aspect of the present invention further comprises one of a diffusion film and a diffusion layer disposed in a plane side of the prism sheet, the plane side being opposed to the light exit plane, wherein: in the one of the diffusion film and the diffusion layer, as diffusion conditions, when a ray having intensity $P_0$ passes through the one of the diffusion film and the diffusion layer transmitted diffused light is represented by Expression (5) below; and an orientation evaluation parameter S represented by Expression (6) below satisfies Expression (7) below, when an intensity distribution of outgoing light from the light guide plate and the one of the diffusion film and the diffusion layer is represented by $L(\phi)$ [cd/m²].

[Equation 1]

$$P(\phi) = P_0 \exp\left[-\frac{1}{2}\cdot\left(\frac{\phi}{\sigma}\right)^2\right] \quad (5)$$

[Equation 2]

$$S(\sigma) = \int_0^{\pi/2} \left|\frac{d^2(L(\phi,\sigma))}{d\phi^2}\right| d\phi \quad (6)$$

$$0 \leq S \leq 20 \quad (7)$$

In Expressions (5) and (6), $\phi$ represents one of a diffusion angle and an emission angle, and $\sigma$ represents a diffusion angle standard deviation.

Preferably, the diffusion film is disposed on a plane of the prism sheet, or the diffusion layer is integrally provided on a plane of the prism sheet.

It is preferable that the light guide plate assembly of the aspect further comprises a polarization separator film disposed on a plane side of the one of the diffusion film and the diffusion layer, the plane side being opposed to the prism sheet, or alternatively, further comprises a polarization separator layer integrally provided on the light exit plane of the light guide plate.

In order to attain the second object described above, a second aspect of the present invention provides a planar lighting device, comprising: the light guide plate assembly according to the first aspect of the present invention; and light sources linearly arranged to face the light entrance end of the light guide plate of the light guide plate assembly.

Preferably, each of the light sources comprises one of an LED and an LD.

In order to attain the third object described above, a third aspect of the present invention provides a light guide plate made of a transparent resin for converting light of light sources into planar light, comprising: a light exit plane having a rectangular outer shape; four light entrance planes which are connected to four sides of the light exit plane and are substantially orthogonal to the light exit plane; and a backside which is planes opposed to the light exit plane and includes four inclined planes inclined to be farther from the light exit plane toward a center from the four light entrance planes, wherein a minimum thickness is in the four light entrance planes and a maximum thickness is in the center from the four light entrance planes.

It is preferable that the light guide plate according to the third aspect of the present invention further comprises a number of scattering particles therein, wherein Expressions (1), (2), and (8) below are satisfied, $$1.1 \leq \Phi N_P L_G K_C \leq 8.2 \quad (1)$$

$$0.005 \leq K_C \leq 0.1 \quad (2)$$

$$1 \leq L_a/L_b \leq 2 \quad (8)$$

where $L_a$ represents a length of one side of the light exit plane, $L_b$ represents a length of a side in a direction orthogonal to the one side, $\Phi$ represents a scattering cross section of the scattering particles, $N_P$ represents a density of the scattering particles, $K_C$ represents a compensation coefficient, and $L_G$ represents a length half of longer one of distances in a light entrance direction between opposing two of the four light entrance planes.

Preferably, each of the four inclined planes is formed flat.

Preferably, a substantially center of the backside is formed to be curved.

Preferably, connection parts of the four inclined planes forming the backside is formed of a curved plane.

And, preferably, a ratio of the maximum thickness $D_{max}$ and the minimum thickness $D_{min}$ satisfies Expression (9) below, $$1 < (D_{max}/D_{min}) \leq 4 \quad (9)$$

In order to attain the fourth object described above, a fourth aspect of the present invention provides a planar lighting device for generating a planar illumination light, comprising: the light guide plate according to the third aspect of the present invention; and four light sources, each arranged to face the four light entrance planes of the light guide plate.

Preferably, the four light sources each include a plurality of white light emitting diodes.

Preferably, an emission density of the light emitting diodes is equal to 2.0 [lm/mm²] or more.

It is preferable that the planar lighting device according to the fourth aspect of the present invention further comprises, in a light exit plane side of the light guide plate, a prism sheet including a plurality of pyramidal prisms regularly arranged on a surface of a sheet made of a transparent resin.

In order to attain the fifth object described above, a fifth aspect of the present invention provides a liquid crystal display device, comprising: the planar lighting device according to the second aspect or fourth aspect; a liquid crystal display panel disposed on a light exit plane side of the planar lighting device; and a drive unit for driving the liquid crystal display panel.

Effects of the Invention

With the light guide plate assembly of the first aspect of the present invention and the planar lighting device of the second aspect of the present invention, by using the light guide plate having the thickness of the light entrance plane made small in the direction perpendicular to the light exit plane and made larger in the light advancing direction, and the prism sheet having the defined vertex angle of the prism and the prism disposed to face the light guide plate, the light entering through the light entrance plane can be caused to reach a farther position, thereby enabling emission of a uniform illumination light having no brightness unevenness without reducing light use efficiency, in other words, enabling emission with high light use efficiency and high front brightness. Besides, the light guide plate assembly and the planar lighting device can be thinned, reduced in weight, and enlarged.

Further, according to the present invention, by the configuration of the fewer number of components compared with the light guide plate assembly and the planar lighting device of the conventional art, it is possible to obtain the light guide plate assembly and the planar lighting device having higher performance compared with the conventional art and the above-mentioned effects at low cost.

The light guide plate of the third aspect of the present invention includes the light exit plane having the rectangular outer shape, the four light entrance planes connected to the four sides of the light exit plane and substantially orthogonal to the light exit plane, and the backside opposed to the light exit plane and formed of the four inclined planes inclined so as to be farther from the light exit plane from the four light entrance planes to the center. Thus, the light guide plate can be formed to be light, thin, and large, and by causing light to enter through the four lateral planes, a planar light having almost no brightness unevenness can be emitted with high emission efficiency.

In the planar lighting device of the fourth aspect of the present invention, the light guide plate of the third aspect of the present invention, which has the configuration attaining the above-mentioned effects, is used, and light is caused to enter through the four light entrance planes of the light guide plate. Thus, a large-area planar illumination light having almost no brightness unevenness but high in-plane uniformity can be emitted, and a light, thin, and large planar lighting device can be realized, which is applicable as a planar lighting device for indoor/outdoor illumination, or as a planar lighting device used as a backlight for a liquid crystal display panel of a liquid crystal display device, an advertisement panel, an advertisement tower, or a billboard.

The liquid crystal display device of the fifth aspect of the present invention includes the planar lighting device of the second or fourth aspect of the present invention, which has the configuration attaining the effect of emitting a large-area planar illumination light of no or almost no brightness unevenness. Thus, a light, thin, and large image-display-area liquid crystal display device can be realized.

Figure 1A:
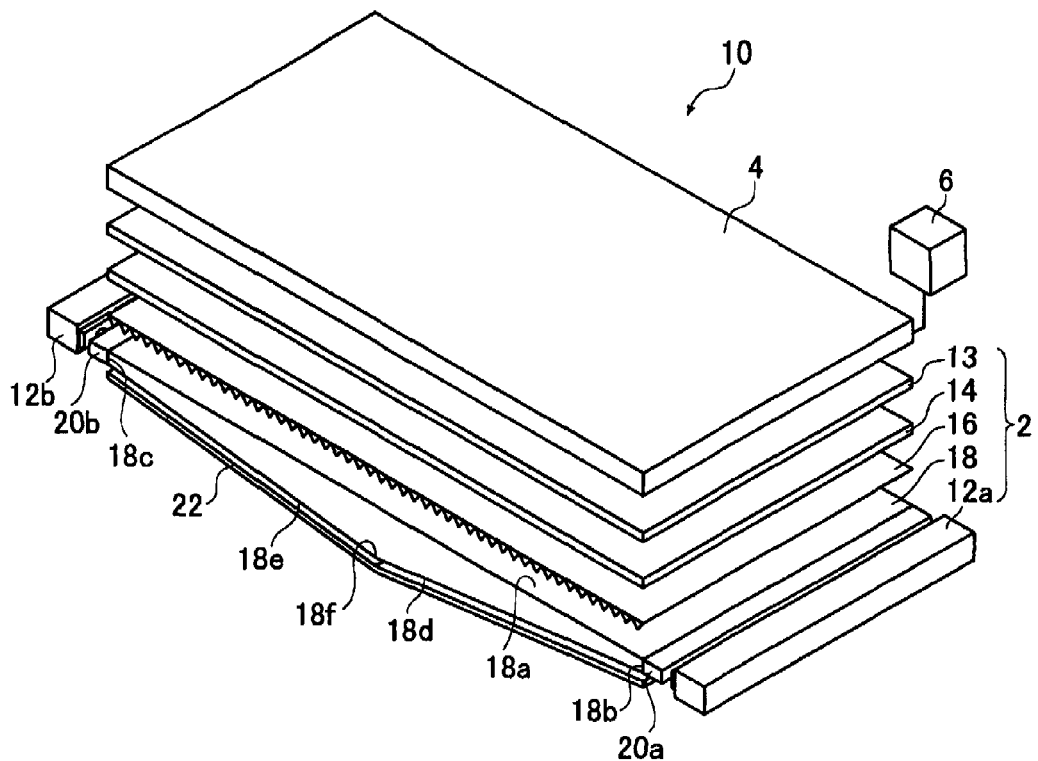
FIGS. 1A and 1B are a schematic perspective view and a schematic sectional view, respectively, of a liquid crystal display device which includes a planar lighting device using a light guide plate assembly according to an embodiment of the present invention.

DESCRIPTION OF SYMBOLS 2, 50, 60, 72 backlight unit
4 liquid crystal display panel
6 drive unit
10, 70 liquid crystal display device
12, 12a, 12b, 12c, 12d, 15 light source
13 polarization separator film
14 diffusion film
16, 74, 76 prism sheet
16a, 16b prism
18, 52, 62 light guide plate
18a, 62a light exit plane 18b, 18c, 52b, 62b, 62c, 62d, 62e light entrance plane
18d, 18e, 52c, 62f, 62g, 62h, 62i inclined plane
18f center ridgeline
18g, 62k backside
20, 20a, 20b, 20v, 20d light mixer
22, 54, 64 reflection sheet
24, 29 LED array
25 LED chip (white LED)
26 multilayered LED arrays
27 heat sink
28, 40 coupling lenses
30 RGB-LED
32 R-LED
34 G-LED
36 B-LED
42, 44, 46 ball lenses
62j intersection point
80 pyramid type prism sheet
82 transparent sheet
84 pyramid type prism

BEST MODE FOR CARRYING OUT THE INVENTION

A light guide plate, a light guide plate assembly, and a planar lighting device and a liquid crystal display device using these are described below in detail by way of preferred embodiments illustrated in attached drawings.

First, referring to FIGS. 1A to 17, a light guide plate assembly of the first aspect of the present invention, a planar lighting device of the second aspect of the present invention using the same, and a liquid crystal display device of the fifth aspect of the present invention are described.

Figure 1B:
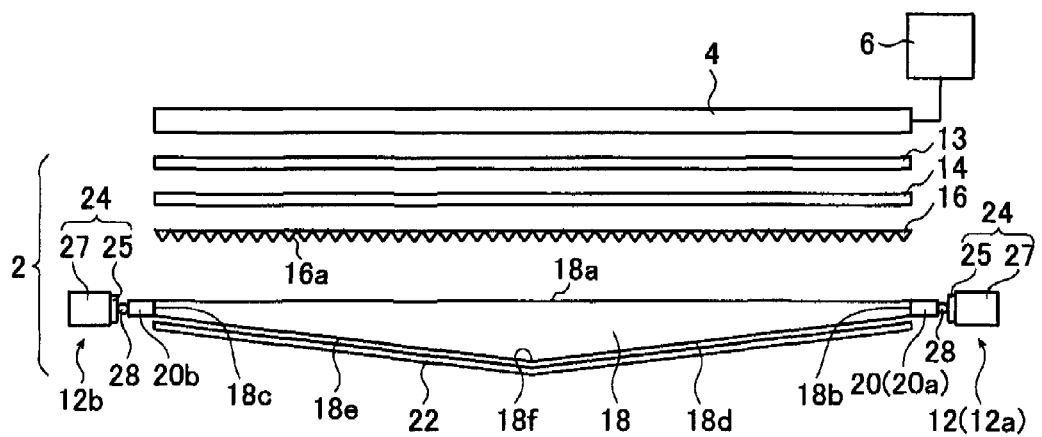
Figure 2A:
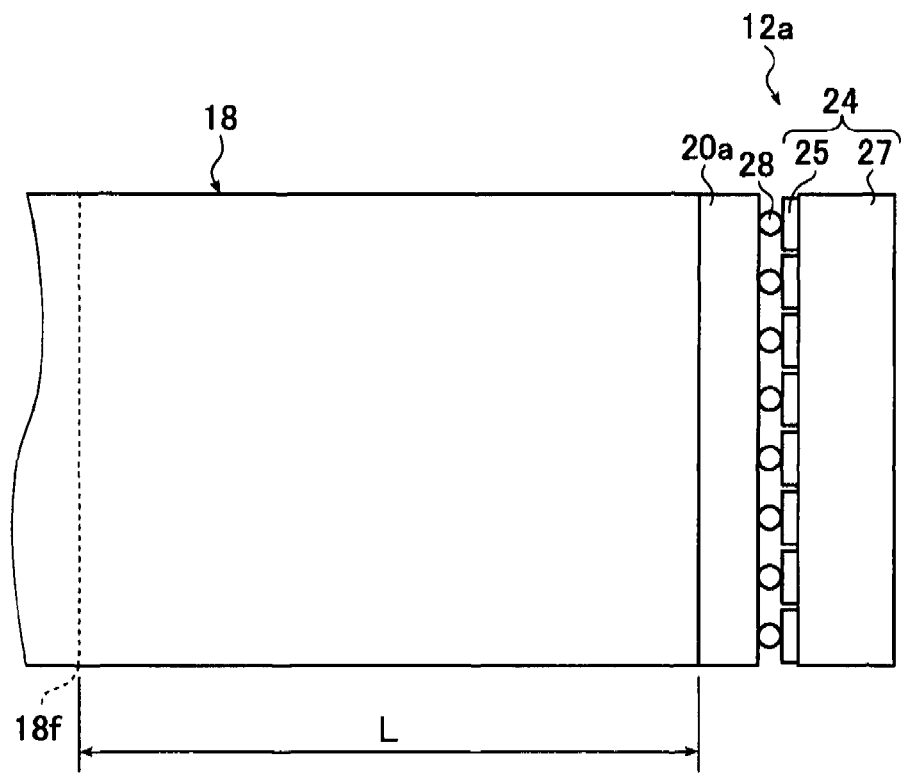
FIGS. 2A and 2B are a schematic plan view and a schematic sectional view, respectively, of a light guide plate and a light source used in the planar lighting device illustrated in FIG. 1.
Figure 2B:
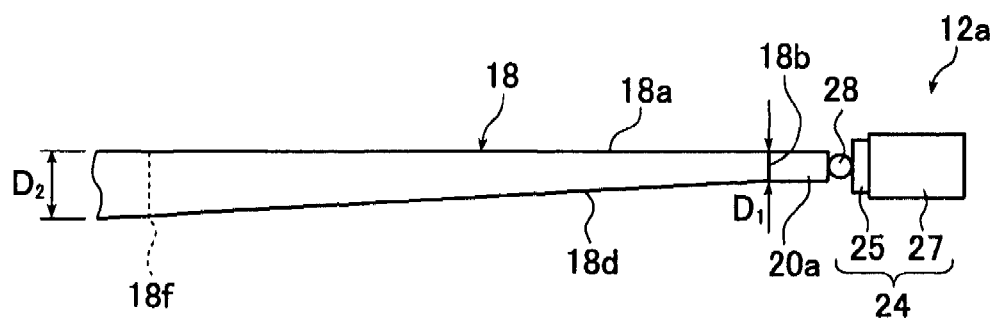

FIG. 1A is a perspective view schematically illustrating a liquid crystal display device according to an embodiment of the present invention, which includes a planar lighting device according to an embodiment of the present invention using a light guide plate assembly according to an embodiment of the present invention, and FIG. 1B is a schematic sectional view of the liquid crystal display device illustrated in FIG. 1A. FIG. 2A is a schematic partial plan view partially illustrating a light guide plate and a light source used in the planar lighting device (hereinafter, referred to as backlight unit) of the present invention, and FIG. 2B is a schematic partial sectional view of the light guide plate and the light source partially illustrated in FIG. 2A.

As illustrated in FIGS. 1A and 1B, a liquid crystal display device 10 according to the present invention includes a backlight unit 2, a liquid crystal display panel 4 disposed on the light exit plane side of the backlight unit 2, and a drive unit 6 for driving the liquid crystal display panel 4.

In the liquid crystal display panel 4, electric field is partially applied to liquid crystal molecules previously arranged in a given direction in liquid crystal cells to change an orientation of the liquid crystal molecules. The resultant changes in refractive index generated in the liquid crystal cells are used to display characters, figures, images, etc., on the liquid crystal display panel 4.

For the liquid crystal display panel 4, there can be used, for example, a liquid crystal display panel compliant with GH, PC, TN, STN, ECB, PDLC, in-plane switching (IPS), and various vertical aligned (VA) methods (MVA, PVA, and EVA), OCB, and a liquid crystal display mode such as a ferroelectric liquid crystal or an antiferroelectric liquid crystal. There is no particular limitation on a driving method of the liquid crystal display panel 4. A driving method that has been known, such as a simple matrix method or an active matrix method, can be used.

The drive unit 6 applies a voltage to transparent electrodes (not shown) included in the liquid crystal display panel 4 to change the orientation of the liquid crystal molecules, thereby controlling the transmittance of the light transmitted through the liquid crystal display panel 4 to display characters, figures, images, etc., on the liquid crystal display panel 4.

The backlight unit 2 is a planar lighting device according to the present invention for illuminating the entire surface of the liquid crystal display panel 4 from behind the liquid crystal display panel 4 and includes a light exit plane having substantially the same shape as an image display surface of the liquid crystal display panel 4.

The backlight unit 2 of the present invention includes, as illustrated in FIGS. 1A and 1B, light sources 12a and 12b, a polarization separator film 13, a diffusion film 14, a prism sheet 16, a light guide plate 18 as a light guide member, light mixers (mixing zones) 20a and 20b, and a reflection sheet 22. The polarization separator film 13, the diffusion film 14, the prism sheet 16, the light guide plate 18, and the reflection sheet 22 form a light guide plate unit of the present invention.

The components of the backlight unit 2 are described below.

As illustrated in FIGS. 1A and 1B, the backlight unit 2 is symmetrical with respect to a center plane formed in a thickest part of the light guide plate 18. Thus, for brevity, depending on necessity, only a half thereof is described. Specifically, the light guide plate 18, the polarization separator film 13, the diffusion film 14, and the prism sheet 16 are symmetrical with respect to the center plane of the light guide plate 18. Thus, only substantially a half thereof is illustrated depending on necessity, and is described. The light sources 12a and 12b and the light mixers 20a and 20b are arranged to be symmetrical with respect to the center plane of the light guide plate 18, and have identical configurations. Thus, depending on necessity, only one of them is described.

First, the light sources 12a and 12b are described by taking the light source 12a as an example.

The light source 12a includes an LED array 24 and coupling lenses 28 and is disposed, as illustrated in FIG. 2A, to be opposite to a lateral end plane of the light mixer 20a which is disposed to adhere to the lateral end plane (light entrance plane 18b) with the thinnest thickness of the light guide plate 18.

The LED array 24 includes a plurality of LED chips 25 arranged at given intervals in a row on the heat sink 27.

Figure 3A:
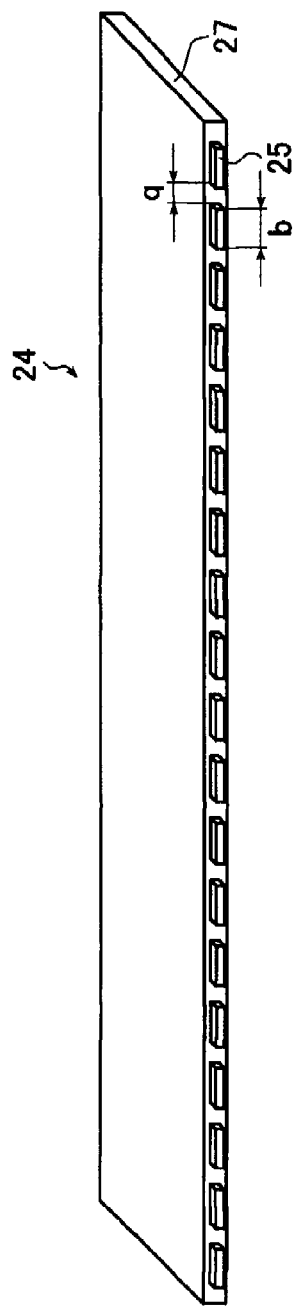
FIG. 3A is a schematic perspective view of a configuration of an LED array used in the planar lighting device illustrated in FIG. 1.
Figure 3B:
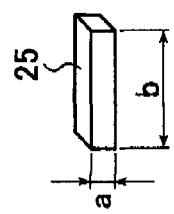
FIG. 3B is a schematic top view of a configuration of an LED chip of the LED array illustrated in FIG. 3A.
Figure 3C:
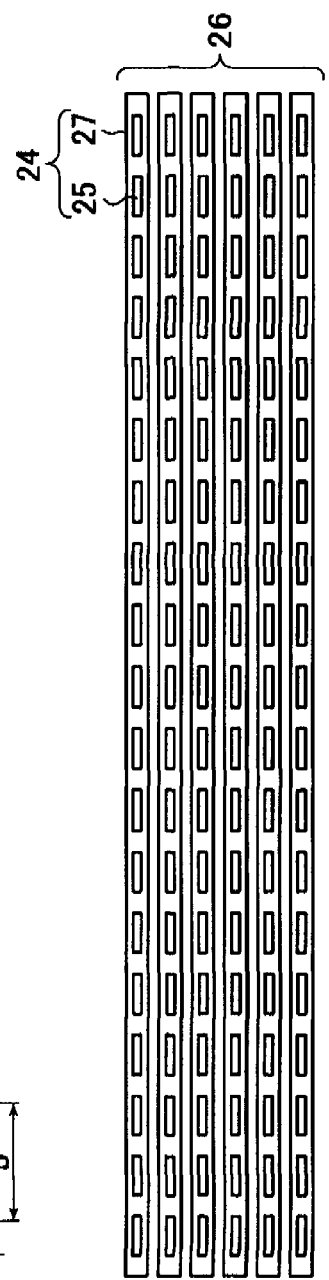
FIG. 3C is a schematic top view of a configuration of multilayered LED arrays used in the planar lighting device illustrated in FIG. 1.
Figure 3D:
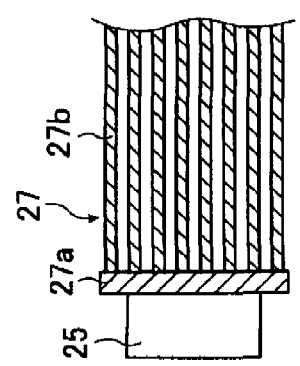
FIG. 3D is a schematic side view of a heat sink of the multilayered LED array according to an embodiment of the present invention illustrated in FIG. 3C.

FIG. 3A is a schematic perspective view of a configuration of the LED array 24, FIG. 3B is a schematic top view of a configuration of the LED chip 25, FIG. 3C is a schematic top view of a configuration of a multilayered LED array 26, and FIG. 3D is a schematic side view of an embodiment of the heat sink 25.

The LED chip 25 is a single-color LED configured to convert a light emitted from the LED into a white light by using a fluorescent material. For example, when a GaN blue LED is used as a single-color LED, a white light can be obtained by using a YAG (yttrium aluminum garnet) fluorescent material.

The heat sink 27 is a sheet member parallel to the lateral end plane (light entrance plane 18b) with the thinnest thickness of the light guide plate 18 and disposed opposite to the light entrance plane 18b (lateral end plane of the light mixer 20a) which is the lateral end plane of the light guide plate 18. The heat sink 27 carries the plurality of LED chips (white LEDs) 25 on the lateral plane serving as the plane opposite to the light entrance plane 18b (lateral end plane of the light mixer 20a) of the light guide plate 18. The heat sink 27 is formed of a metal having a good thermal conductivity, such as copper or aluminum, to absorb and release to the outside heat generated by the LED chips 25.

The heat sink 27 preferably has a shape so that, as in this embodiment, the length thereof in the direction perpendicular to the plane thereof facing the light guide plate 18 is longer than the length of the plane thereof facing the light guide plate 18 in the direction of the shorter sides. This increases the efficiency with which the LED chips 25 are cooled.

Here, the heat sink preferably has a large surface area. For example, the heat sink 27 may include, for example, a base 27a carrying the LED chips 25 and a plurality of fins 27b joined to the base 27a as illustrated in FIG. 3D.

Provision of the plurality of fins 27b secures a large surface area and a high heat dissipation efficiency, thereby increasing the efficiency with which the LED chips 25 are cooled.

The heat sink is not limited to an air-cooled type, and a water-cooled type can also be used.

It should be noted that this embodiment uses a heat sink as a support member for the LED chips, but the present invention is not limited thereto. In a case where the LED chips do not need to be cooled, a sheet member without a heat-releasing function may also be used as the support member.

As illustrated in FIG. 3B, the LED chip 25 according to this embodiment has a rectangular shape so that the sides perpendicular to the direction in which the LED chips 25 are arrayed are shorter than the sides lying in the direction in which the LED chips 25 are arrayed or, in other words, the sides lying in the direction of thickness of the light guide plate 18 (direction perpendicular to the light exit plane 18a) are the shorter sides. In other words, the LED chip 25 has a shape satisfying b>a where "a" represents the length of the sides perpendicular to the light exit plane 18a of the light guide plate 18 and "b" represents the length of the sides in the direction of the array. Further, let "q" be a distance by which the arrayed LED chips 25 are spaced apart from one another, then q<b holds. Thus, the relationship among the length "a" of the sides of the LED chips 25 perpendicular to the light exit plane 18a of the light guide plate 18, the length "b" of the sides in the direction of the array, and the distance "q" of the LED chips 25 by which the arrayed LED chips 25 are spaced apart from one another preferably satisfies the following Expression (10):

$$q > b > a \qquad (10)$$

The LED chips 25 each given a rectangular shape allow the thickness of the light source to be reduced while maintaining output of a great amount of light. A thinner light source enables a thinner design of the planar lighting device to be achieved.

It should be noted that the LED chips 25 each preferably have a rectangular shape with the shorter sides lying in the direction of thickness of the light guide plate 18 to achieve a thinner design of the LED array 24, but the present invention is not limited thereto, allowing use of LED chips having various shapes such as a square, a circle, a polygon, and an ellipse.

While the LED array is monolayered in this embodiment, the present invention is not limited thereto, and multilayered LED arrays 26 including a plurality of LED arrays 24 stacked on each other can be used for the light source as illustrated in FIG. 3C. Even in a case where the LEDs are thus stacked, more LED arrays can be stacked if the LED chips have a rectangular shape and the LED arrays each to have a reduced thickness. When the LED arrays are stacked into a multilayer, that is to say, when more LED arrays (LED chips) are packed into a given space, an increased amount of light can be generated. Preferably, the above-mentioned Expression (10) also applies to the distance separating the LED chips of an LED array from the LED chips of the LED arrays in adjacent layers. In other words, the LED arrays preferably are stacked so that the LED chips are spaced a given distance apart from the LED chips of the LED arrays in adjacent layers.

As illustrated in FIGS. 1A and 1B, FIGS. 2A and 2B, ball lenses are provided as coupling lenses 28 on the light exit side of the respective LED chips 25 of the LED array 24. The coupling lenses 28 are disposed correspondingly to the respective LED chips 25. Light emitted by the individual LED chip 25 is collimated by the coupling lenses 28 before entering the light mixer 20 of the light guide plate 18.

While ball lenses are used as coupling lenses here, no specific limitations are placed on the coupling lenses, provided that they are capable of collimating light emitted by the LEDs. As the coupling lenses, for example, a cylindrical lens, a lenticular lens, a half-cylindrical lens, a Fresnel lens can be used.

In the present invention, as illustrated, light beams emitted from the light exit plane 18a of the light guide plate 18 preferably enters through two lateral end planes, i.e., two light entrance planes 18 and 18c, of the light guide plate 18. Simultaneously, by forming the LED array 24 where the plurality of LED chips 25 constituting each of the light sources 12a and 12b are arranged at high density to a certain extent in array shape, the light source 12 is preferably configured to function as a thin planar light source (linear light source) in a pseudo-manner.

In this case, it is important that emission densities of light emitted from the light sources 12a and 12b to enter the two light entrance planes 18 and 18c of the light guide plate 18 are denoted by $S_L$[lm/mm$^2$] and, in the present invention, the emission density $S_L$ is preferably set to a fixed value or higher, for example, 2.0 [lm/mm$^2$] or higher. The emission density $S_L$ necessary for a light to be entered to each of the two light entrance planes 18 and 18c of the light guide plate 18 can be represented by the following Expression (11), where E[lx] denotes a necessary illuminance emitted from the light exit plane 18a of the light guide plate 18, $L_a$[m] denotes a length of the light guide plate 18 in a longitudinal direction, $L_b$[m] denotes a length in a direction orthogonal to the longitudinal direction, t[m] denotes a thickness of the light guide plate, and p denotes light use efficiency of the light guide plate.

[Equation 3]

$$S_L = \frac{E \cdot L_a \cdot L_b}{p \cdot 2(L_a + L_b) \cdot t} \qquad (11)$$

According to the present invention, by using a light source where the emission density $S_L$ satisfies the above-mentioned Expression (11) and a real size of a light emission area of the LED chip 25 is less than the thickness of the light guide plate 18, a planar lighting device higher in brightness, thinner and larger than the conventional device can be realized.

Next, the light guide plate 18 that is one of characteristic portions of the present invention and a main member of the backlight unit 2 is described.

The light guide plate 18 includes, as illustrated in FIGS. 1A and 1B and FIGS. 2A and 2B, a substantially rectangular flat light exit plane 18a, two light entrance planes 18b and 18c disposed to be substantially orthogonal to the light exit plane 18a and to face each other in two opposing ends of this rectangular light exit plane 18a, in other words, two opposing sides, and inclined planes 18d and 18e positioned on a side opposite to the light exit plane 18a to incline toward the center of the light entrance planes 18b and 18c at predetermined angles to the light exit plane 18a.

The light exit plane 18a is parallel to an optical axis direction of a light emitted from the light source 12a and entered to the light entrance plane 18b via the light mixer 20a, and an optical axis direction of a light emitted from the light source 12b and entered to the light entrance plane 18c via the light mixer 20b. The light entrance planes 18b and 18c are lateral end planes of both ends with the thinnest thickness of the light guide plate 18, and the light mixers 20a and 20b are respectively disposed in a manner of being bonded to the planes. In the light entrance planes 18b and 18c, the LED arrays 24 of the light sources 12a and 12b are arranged to face each other, and light from the LED arrays 24 of the light sources 12a and 12b is entered via the light mixers 20a and 20b.

The inclined planes 18d and 18e incline with respect to the light exit plane 18a so that thicknesses in the direction orthogonal to the light exit plane 18a can be larger as becoming farther from the light entrance plane 18b or 18c, cross each other at the center of the light entrance planes 18b and 18c, and form a center ridgeline 18f, thereby constituting a backside 18g with respect to the light exit plane 18a.

As a result, the light guide plate 18 is formed into a shape where the light guide plate 18 is thinnest in the light entrance planes 18b and 18c, made thicker from both sides toward the center ridgeline 18f at the center, and thickest (maximum thickness) in the center ridgeline 18f at the center of both. There is no particular limitation on inclined angles of the inclined planes 18d and 18e to the light exit plane 18a.

Here, the direction of the optical axis (hereinafter, also referred to simply as "optical axis direction") of the light that is emitted by the light source 12a and enters the light entrance plane 18b through the light mixer 20a and the light which is emitted by the light source 12b and enters the light entrance plane 18c through the light mixer 20b is the central axis of the light that enters the light entrance planes 18b and 18c, and is a direction perpendicular to the light entrance planes 18b and 18c, that is, a direction parallel to the light exit plane 18a in this embodiment.

In the light guide plate 18 illustrated in FIG. 2, light entering through the light entrance planes 18b and 18c is scattered by scatterers (described later in detail) contained inside the light guide plate 18, travels through the inside of the light guide plate 18 directly or while being scattered, and is reflected by the inclined planes 18d and 18e to exit through the light exit plane 18a. On this occasion, a part of the light leaks from the inclined planes 18d and 18e in some cases, and the leaking light is reflected by the reflection sheet 22 (illustrated in FIG. 1) so provided as to cover the inclined planes 18d and 18e of the light guide plate 18, and again enters the inside of the light guide plate 18.

Generally, in the light guide plate, to increase light use efficiency, a light loss caused by passing of a light entered from the light entrance end through the end plane of the opposite side has to be suppressed to a minimum, and most of the light has to be emitted from the light exit plane. Thus, according to the present invention, scatterers (scattering particles) are dispersed in the light guide plate. As described below, an internal scattering effect is associated with a scattering cross section (scattering energy per unit time) determined from particle diameters of the scattering particles, a refractive index, a particle size distribution, and a refractive index of a material as a base material by Mie theory, a particle density, and a light guiding distance from the entrance.

According to the present invention, by appropriately defining these, high light use efficiency impossible by the conventional light guide plate technology can be achieved.

When the scattering particles are mixed in the light guide plate to maximize the light use efficiency, brightness unevenness always appears in the light exit plane. This occurs because the presence of the scattering particles causes emission of much light near the light entrance end of the light guide plate. Thus, according to the present invention, to suppress brightness unevenness, a taper is formed in the backside of the light guide plate (opposite side of light exit plane) to increase a probability of full-reflection of rays in the light guide plate.

Thus, according to the present invention, as illustrated in FIG. 1B, for example, by the inclined plane 18d which inclines such that the light guide plate 18 becomes wider (thicker) from the light entrance plane 18b of the light guide plate 18 in an advancing direction (left direction in the drawing) of an incoming light, leakage of the incoming light out of the light guide plate 18 near the light entrance plane 18b of the light guide plate 18, in other words, near the light entrance end, can be suppressed, and the incoming light can be guided near the center (center ridgeline 18f) of the light guide plate 18. By the inclined plane 18e which inclines such that the light guide plate 18 becomes narrower (thinner) from the light entrance plane 18b in the advancing direction (left direction in the drawing) of the incoming light after the thickest center (center ridgeline 18f) of the light guide plate 18, for example, a light entered from the light entrance plane 18b of the light guide plate 18 and passed through the thickest center (center ridgeline 18f) of the light guide plate 18 is emitted more easily from the light exit plane 18a, whereby emission efficiency can be increased.

Thus, according to the present invention, the planes of the light guide plate 18 facing the light exit plane 18a are set as the inclined planes 18d and 18e, and the thickness of the light guide plate 18 is gradually increased as becoming farther from the light entrance planes 18b and 18c, becoming maximum on the center ridgeline 18f. This shape of the light guide plate 18 enables light entered from the light entrance planes 18b and 18c with the thinnest thickness to reach farther, at least near the center ridgeline 18f. In other words, when a light entered to the light guide plate 18 is fully reflected between the light exit plane 18a and the inclined planes 18d and 18e, an incident angle is gradually reduced, causing a difficulty of going-out of the light from the light exit plane 18a. Thus, the incoming light can reach farther. As a result, the planar lighting device can be reduced in weight, thinned, and enlarged.

The portion of the center ridgeline 18f in the backside of the light guide plate 18 forms a pointed ridge portion or a corner portion (portion of intersection point) where the inclined planes 18d and 18e intersect each other. Thus, in some cases, in the light exit plane 18a of the light guide plate 18, a dark line corresponding to the center ridgeline 18f (vertex portion) is generated to be viewed. In this case, preferably, the generation of a dark line is prevented by rounding the center ridgeline 18f to make a vertex of a section round (R), or a dark line is made invisible or difficult to be viewed by suppressing the generation of the dark line.

The light guide plate 18 preferably satisfies a relationship of the following Expression (12):

$$D_1 < D_2, \text{ and}$$

$$1/1,000 < (D_2 - D_1)/L < 1/10 \tag{12}$$

where $D_1$ denotes a minimum thickness of the light guide plate 18 in the light entrance planes 18b and 18c, $D_2$ denotes a maximum thickness of the light guide plate 18 in the center ridgeline 18f portion of the light entrance planes 18b and 18c, and L denotes an incoming-direction length of a light in the light guide plate 18 from the light entrance plane 18b or 18c to the center ridgeline 18f portion, in other words, a length half of a total length of the light guide plate 18 in the light incoming direction.

In other words, inclined angles of the inclined planes 18d and 18e with respect to the light exit plane 18a of the light guide plate 18 described above are preferably larger than 5.73E-3° and smaller than 5.71° when both are measured on sharp angle sides.

By employing a shape which satisfies Expression (12), the light guide plate 18 can be more suitably thinned, reduced in weight, and enlarged. Thus, the planar lighting device can be thinned, reduced in weight, and enlarged.

According to the present invention, the light guide plate 18 contains scattering particles described below therein. In the present invention, the light guide plate 18 contains the scattering particles, and a light is appropriately scattered to let out of a full-reflection condition, thereby providing a function of emitting a light which has become difficult to be emitted by the light guide plate alone. Thus, light emitted from the light exit plane can be made more uniform.

In addition to the scattering particles, by adding transmittance adjusters to the light exit plane side of the light guide plate 18, and appropriately adjusting an arranging density of the transmittance adjusters, as in the case of the scattering particles, uniform light can be emitted.

In the present invention, as described above, the light guide plate 18 is formed of a transparent resin into which scattering particles for scattering light are kneaded and dispersed.

As a transparent resin material that may be used to form the light guide plate 18, there are optically transparent resins such as polyethylene terephthalate (PET), polypropylene (PP), polycarbonate (PC), polymethyl methacrylate (PMMA), benzyl methacrylate, an acrylic resin, an MS resin, and cycloolefin polymer (COP).

As the scattering particles kneaded and dispersed into the light guide plate 18, for example, TOSPEARL, silicone, silica, zirconia, or a derivative polymer can be used. The light guide plate 18 containing such scattering particles is capable of emitting uniform illumination light through the light exit plane with a reduced level of brightness unevenness.

The light guide plate 18 as described above may be manufactured using an extrusion molding method or an injection molding method.

Now, when it is assumed that: $\Phi$ is the scattering cross section of the scattering particles contained in the light guide plate 18; $L_G$ [m] is a half length of the full length of the light guide plate 18 in the direction in which light is launched or admitted from the light entrance plane 18b or 18c to a position of the center ridgeline 18f where the thickness of the light guide plate in the direction perpendicular to the light exit plane is greatest, the length $L_G$ being, in this embodiment, a half length of the full length of the light guide plate in the direction in which light is launched (direction perpendicular to the light entrance planes 18b and 18c of the light guide plate 18, hereinafter, also referred to as "optical axis direction"); $N_p$ the density of the scattering particles contained in the light guide plate 18 (number of particles in unit volume); and $K_C$ a compensation coefficient. Then a relationship holds that the value $\Phi \cdot N_p \cdot L_G \cdot K_C$ is not less than 1.1 and not greater than 8.2, and that the compensation coefficient $K_C$ is not less than 0.005 and not greater than 0.1. The light guide plate 18 according to the present invention contains scattering particles satisfying the above-mentioned relationship, and hence is capable of emitting uniform illumination light through the light exit plane with a reduced level of brightness unevenness.

In other words, the scattering particles used in the present invention need to be contained in the light guide plate 18, which is illustrated in the drawings, and dispersed so as to satisfy Expressions (1) and (2) below:

$$1.1 \leq \Phi \cdot N_p \cdot L_G \cdot K_C \leq 8.2 \tag{1}$$

$$0.005 \leq K_c \leq 0.1 \tag{2}$$

In the above-mentioned Expressions (1) and (2), $\Phi$ represents a scattering cross section [m²] of the scattering particles, $N_p$ represents a density [pieces/m³] of the scattering particles, $L_G$ represents a half of the length of the light guide plate 18 in a direction in which the light enters (length extending from the thinnest part to the thickest part of the light guide plate 18 in a direction in which the light enters), and $K_C$ represents a compensation coefficient.

Expressions (1) and (2) that the scattering particles kneaded and dispersed in the light guide plate 18 of the present invention should satisfy are described below.

When parallel light beams are caused to enter an isotropic medium, a transmittance T is generally expressed according to the Lambert-Beer law by the following Expression (13):

$$T = I/I_o = \exp(-\rho \cdot x) \tag{13}$$

where x is a distance, $I_o$ is an intensity of incoming light, I is an intensity of outgoing light, and $\rho$ is an attenuation constant.

The above-mentioned attenuation constant $\rho$ is expressed using $\Phi$, the scattering cross section of the scattering particles and $N_p$, the number of particles in unit volume contained in the medium by Expression (14):

$$\rho = \Phi \cdot N_p \tag{14}$$

Accordingly, a light extraction efficiency $E_{out}$ is expressed by the following Expression (15) where $L_G$ is the length in the direction of the optical axis in the light guide plate. The half length $L_G$ of the light guide plate in the direction of the optical axis is the length of the light guide plate 18 in the direction perpendicular to the light entrance plane, extending from one of the light entrance planes of the light guide plate 18 to the center of the light guide plate 18 (that is, the half length $L_G$ can be defined as the farthest distance at which the light that has entered one light entrance plane is to be emitted from the light exit plane).

The light extraction efficiency is a ratio of light reaching the position distanced from the light entrance plane of the light guide plate by the length $L_G$ in the direction of the optical axis with respect to the incoming light. In the case of the light guide plate 18 illustrated in FIG. 2, for example, the light extraction efficiency is a ratio of light reaching the center (position at the half of the length of the light guide plate in the optical axis direction, that is, position of the center ridgeline 18f) of the light guide plate 18 with respect to the light that enters the light entrance plane.

$$E_{out} \propto \exp(-\Phi \cdot N_p \cdot L_G) \tag{15}$$

Expression (15) applies to a space of limited dimensions. To correct the relationship with Expression (13), the compensation coefficient $K_C$ is therein introduced. The compensation coefficient $K_C$ is a dimensionless compensation coefficient empirically obtained when light propagates through an optical medium of limited dimensions. The light extraction efficiency $E_{out}$ is then expressed by the following Expression (16).

$$E_{out} = \exp(-\Phi \cdot N_p \cdot L_G \cdot K_C) \tag{16}$$

According to Expression (16), when $\Phi \cdot N_p \cdot L_G \cdot K_C$ is 3.5, the light extraction efficiency $E_{out}$ is 3%; when $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. It is assumed that the light extraction efficiency $E_{out}$ thus decreases because light is scattered increasingly as the light travels in the direction of the optical axis of the light guide plate.

It follows, therefore, that, as the value $\Phi \cdot N_p \cdot L_G \cdot K_C$ becomes greater, the value becomes more preferable as a property of the light guide plate. To be more specific, when $\Phi \cdot N_p \cdot L_G \cdot K_C$ is great, light exiting through the plane opposed to the light entrance plane can be reduced whereas light emitted through the light exit plane can be increased. In other words, when $\Phi \cdot N_p \cdot L_G \cdot K_C$ is great, the ratio of the light emitted through the light exit plane to the light that enters the light entrance plane can be increased (hereinafter, that ratio being also referred to as "light use efficiency"). Specifically, a light use efficiency as high as 50% or more is achieved when $\Phi \cdot N_p \cdot L_G \cdot K_C$ is 1.1 or greater.

While light emitted through the light exit plane 18a of the light guide plate 18 increasingly exhibits illuminance unevenness as $\Phi \cdot N_p \cdot L_G \cdot K_C$ increases, the illuminance unevenness can be held to under a given level (within tolerable range) by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the light guide plate according to the present invention preferably satisfies a relationship that the value is not less than 1.1 and not greater than 8.2 as in Expression (1), and more preferably not less than 2.0 and not greater than 7.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1 as in Expression (2).

Now, the light guide plate in which scattering particles are dispersed is described in greater detail by way of specific examples, and reasons for limiting Expressions (1) and (2) above are described.

First, the inventors of the present invention have conducted a computer simulation using the light guide plates 18 illustrated in FIGS. 2A and 2B in which scattering particles are dispersed, to obtain light use efficiencies for different light guide plates given different values of $\Phi \cdot N_p \cdot L_G \cdot K_C$ by varying the scattering cross section $\Phi$ of the scattering particles, the particle density $N_p$, the length $L_G$ which is a half of the length of the light guide plate in the direction of the optical axis, and the compensation coefficient $K_C$. Further, illuminance unevenness was evaluated. Here, the illuminance unevenness (%) was defined as $[(I_{Max}-I_{Min})/I_{Ave}]\times 100$, where $I_{Max}$ was a maximum illuminance of light emitted through the light exit plane of the light guide plate, $I_{Min}$ was a minimum illuminance, and $I_{Ave}$ was an average illuminance.

The measurement results are illustrated in Table 1. In Table 1, "○" indicates a case where the light use efficiency is 50% or more and the illuminance unevenness is 150% or less whereas "x" indicates a case where the light use efficiency is less than 50% or the illuminance unevenness is more than 150%.

Figure 4:
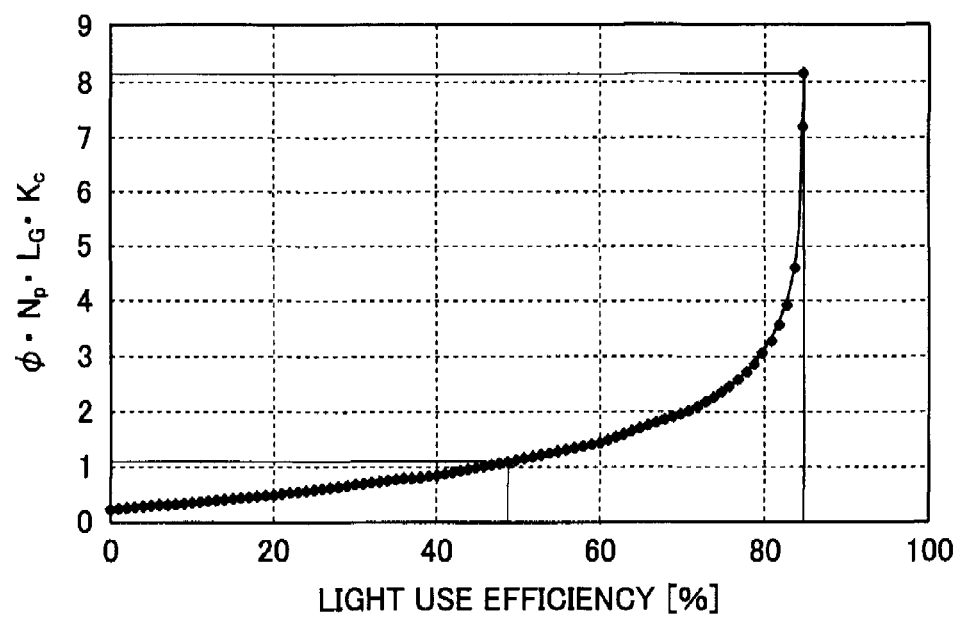
FIG. 4 is a graph illustrating a relationship between $\Phi \cdot N_p \cdot L_G \cdot K_C$ representing scattering performance of scattering particles contained in the light guide plate and light use efficiency.

FIG. 4 illustrates a result of measuring of a relationship between values of $\Phi \cdot N_p \cdot L_G \cdot K_C$ and light use efficiency (ratio of light emitted from light exit plane to light entered to light entrance plane).

TABLE 1

|  | $\Phi$ [m²] | $N_P$ [pieces/m³] | $L_G$ [m] | $K_c$ | $\Phi N_p L_G K_c$ | Light use efficiency [%] |
| --- | --- | --- | --- | --- | --- | --- |
| Example 1 | $2.0 \times 10^{-12}$ | $2.2 \times 10^{14}$ | 0.3 | 0.03 | 3.51 | 81.6 |
| Example 2 | $2.0 \times 10^{-12}$ | $4.3 \times 10^{14}$ | 0.3 | 0.02 | 6.21 | 84.7 |
| Example 3 | $2.0 \times 10^{-12}$ | $8.6 \times 10^{14}$ | 0.1 | 0.02 | 3.86 | 82.8 |
| Example 4 | $1.1 \times 10^{-10}$ | $1.5 \times 10^{13}$ | 0.3 | 0.008 | 3.91 | 83.0 |
| Example 5 | $1.1 \times 10^{-10}$ | $2.0 \times 10^{13}$ | 0.3 | 0.007 | 4.98 | 84.3 |
| Example 6 | $1.1 \times 10^{-10}$ | $3.5 \times 10^{13}$ | 0.1 | 0.007 | 2.86 | 79.2 |
| Comparative Example 1 | $2.0 \times 10^{-12}$ | $2.2 \times 10^{13}$ | 0.3 | 0.05 | 0.66 | 29.1 |
| Comparative Example 2 | $1.1 \times 10^{-12}$ | $2.5 \times 10^{12}$ | 0.3 | 0.01 | 0.99 | 43.4 |
| Comparative Example 3 | $4.8 \times 10^{-19}$ | $8.6 \times 10^{17}$ | 0.1 | 15.2 | 6.26 | 84.8 |
| Comparative Example 4 | $4.8 \times 10^{-18}$ | $1.7 \times 10^{18}$ | 0.1 | 13.9 | 11.5 | 84.9 |

Table 1 and FIG. 4 illustrate that, by setting $\Phi \cdot N_p \cdot L_G \cdot K_C$ to 1.1 or more, a high light use efficiency, specifically 50% or more, is achieved whereas, by setting $\Phi \cdot N_p \cdot L_G \cdot K_C$ to 8.2 or less, illuminance unevenness can be held to 150% or less.

It is also shown that, by setting $K_c$ to 0.005 or more, a high light use efficiency is achieved, and, by setting $K_c$ to 0.1 or less, illuminance unevenness observed in light emitted from the light guide plate can be reduced to a low level.

Next, light guide plates varying in particle density $N_p$ of the scattering fine particles kneaded and dispersed or mixed and dispersed therein are fabricated to measure illuminance distributions of light emitted at different positions in the light exit plane of the individual light guide plates. In the embodiment, the conditions including scattering cross section $\Phi$, length $L_G$, which is a half of the length of the light guide plate in the direction of its optical axis, compensation coefficient $K_C$, and shape of the light guide plate, but excluding particle density $N_p$, are respectively set to fixed values. In this embodiment, therefore, the value $\Phi \cdot N_p \cdot L_G \cdot K_C$ changes in proportion as the particle density $N_p$ changes.

Figure 5:
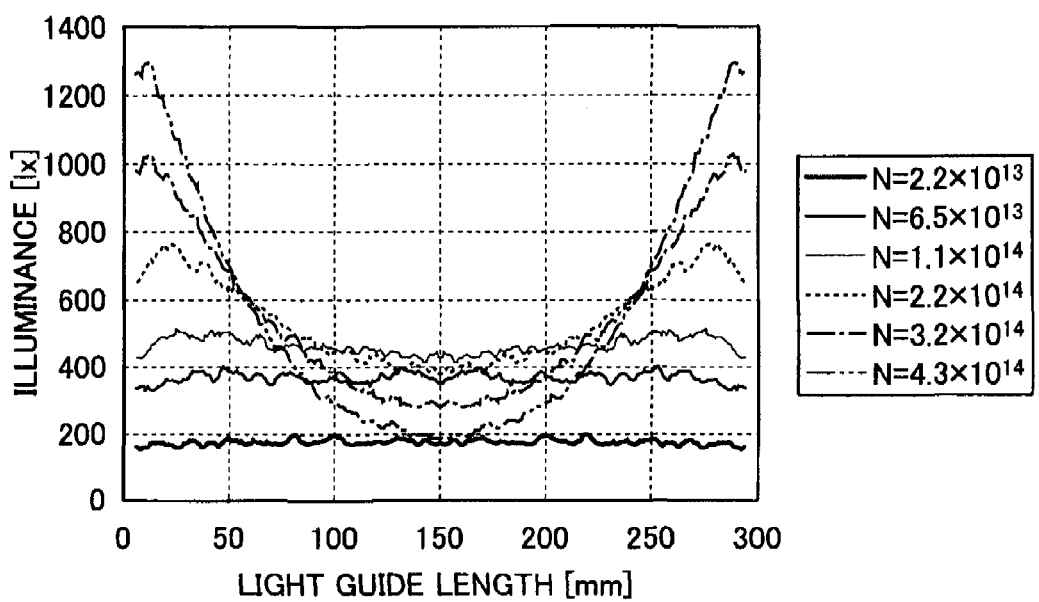
FIG. 5 is a graph illustrating results of measuring illuminances of light emitted from light guide plates having different particle densities of scattering particles.

FIG. 5 illustrates results of the measurements of the distribution of illuminance observed in the light emitted through the light exit plane of the individual light guide plates having different particle densities. FIG. 5 indicates the illuminance [lx] on the vertical axis plotted against the distance (light guide length) [mm] from one of the light entrance planes of the light guide plate on the horizontal axis.

Illuminance unevenness is calculated from $[(I_{Max}-I_{Min})/I_{Ave}]\times 100$ [%], where $I_{Max}$ is a maximum illuminance in the measured illuminance distribution of light emitted from the lateral ends of the light guide plate, $I_{Min}$ is a minimum illuminance, and $I_{Ave}$ is an average illuminance.

Figure 6:
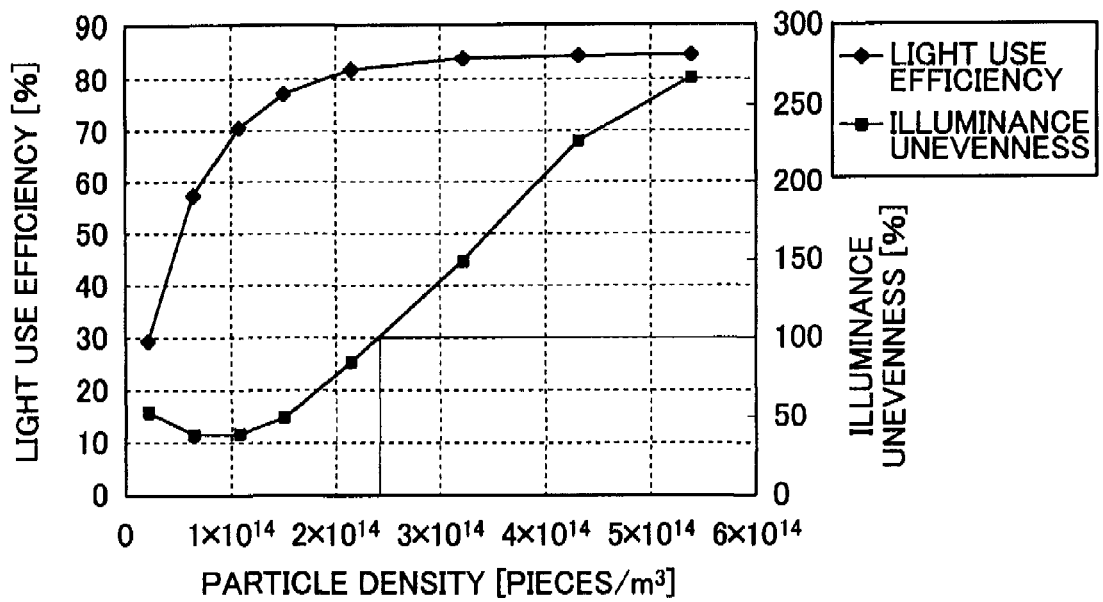
FIG. 6 is a graph illustrating a relationship between light use efficiency/illuminance unevenness and particle densities.

FIG. 6 illustrates a relationship between the calculated illuminance unevenness and particle density. FIG. 6 indicates the illuminance unevenness [%] on the vertical axis plotted against the particle density [pieces/m$^3$] on the horizontal axis. Also illustrated in FIG. 6 is a relationship between light use efficiency and particle density, in which the particle density is likewise indicated on the horizontal axis and the light use efficiency [%] is indicated on the vertical axis.

As illustrated in FIGS. 5 and 6, increasing the particle density or, consequently, increasing $\Phi \cdot N_p \cdot L_G \cdot K_C$, results in an enhanced light use efficiency but then illuminance unevenness also increases. The graphs also illustrate that reducing the particle density or, consequently, reducing $\Phi \cdot N_p \cdot L_G \cdot K_C$, results in lowered light use efficiency but then illuminance unevenness decreases.

$\Phi \cdot N_p \cdot L_G \cdot K_C$ of not less than 1.1 and not greater than 8.2 yields a light use efficiency of 50% or more and illuminance unevenness of 150% or less. Illuminance unevenness, when reduced to 150% or less, is inconspicuous.

Thus, it is understood that $\Phi \cdot N_p \cdot L_G \cdot K_C$ of not less than 1.1 and not greater than 8.2 yields light use efficiency above a certain level and a reduced illuminance unevenness.

The reason why the scattering-particle-dispersed light guide plate used by the present invention should satisfy Expressions (1) and (2) has been described.

As illustrated in FIGS. 1A and 1B and FIGS. 2A and 2B, in the backlight unit 2 of this embodiment, light mixers 20a and 20b are disposed in a manner of being bonded to the light entrance planes 18b and 18c of both side ends of the light guide plate 18. The light mixer 20a is described as a representative example. The light mixer 20a is a columnar optical component where scattering particles for scattering light are mixed in a transparent resin, and has a function of mixing light incoming from white LED chips 25 arranged in array shape at predetermined intervals via coupling lenses 28, and making light incoming to the light entrance plane 18b of the light guide plate 18 uniform in an arraying direction of the LED chips 25. When single-color LED elements of three primary colors such as R, G, and B are combined to be used in place of an LED array 24 including the white LED chips 25, the light mixer 20a has a function of mixing single-color lights from the three single-color LEDs to generate a white light.

As a material of the light mixer 20a, basically, the same material as that of the light guide plate 18 can be used. As in the case of the light guide plate 18, scatterers (scattering particles) for scattering a light can be contained therein. A density of the scatterers (scattering particles) contained in the light mixer 20a may be similar to or different from that of the light guide plate 18. The light mixer 20a is, as illustrated in FIGS. 2A and 2B, disposed close to the LED array 24. Thus, the light mixer 20a is preferably formed by using a material of high heat resistance.

In this embodiment, the light mixer 20a is disposed as a member different from the light guide plate 18. The present invention is not limited to this. The light mixer 20a may be integral with the light guide plate 18, may be made of the same member, or a part of the light entrance plane 18b side of the light guide plate 18 may be used as the light mixer 20a.

Next, the prism sheet 16 that is another characteristic part of the present invention is described.

The prism sheet 16 is a transparent film sheet formed by arraying a plurality of prisms in parallel as illustrated in FIGS. 1A and 1B and helps condense the light emitted through the light exit plane 18a of the light guide plate 18 to improve brightness. In the present invention, the prism sheet 16 is disposed such that the prism arrays or the vertexes of the prisms 16a face the light exit plane 18a of the light guide plate 18, as illustrated or face downwardly in the drawing. Preferably, in the present invention, the prism sheet 16 is disposed such that an extending direction of each prism array is parallel to the light entrance planes 18b and 18c of the light guide plate 18 as illustrated.

In the present invention, the prism sheet 16 can improve front brightness by a light of high use efficiency emitted from the light exit plane 18a of the light guide plate 18 by limiting a shape of prisms of each prism row to a predetermined shape, specifically, by defining a vertex angle range compliant with a triangle shape of a section of each prism. As a result, light use efficiency and front brightness of the backlight unit 2 can be improved.

Figure 7A:
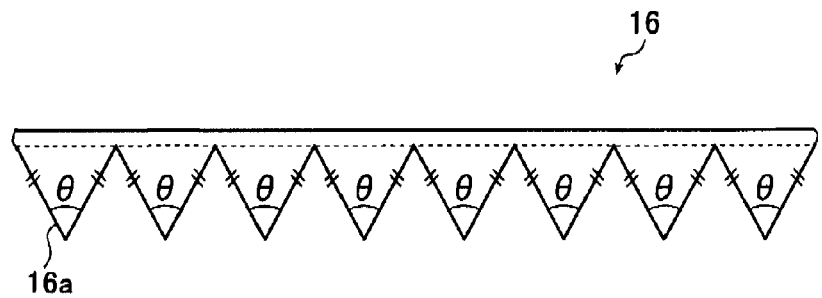
FIGS. 7A and 7B are schematic views each illustrating a prism shape of a prism sheet used in the present invention.
Figure 7B:
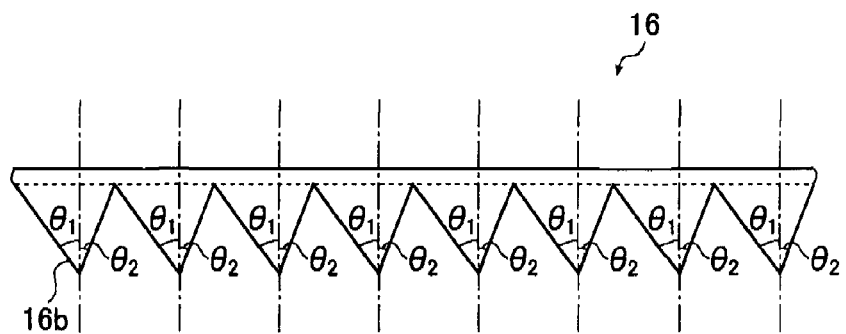

FIGS. 7A and 7B are enlarged schematic views each illustrating an example of a sectional shape of a prism of the prism sheet used by the present invention.

First, in the present invention, as illustrated in FIG. 7A, when a sectional shape of a prism 16a of a symmetrical prism sheet 16 is an isosceles triangle, in other words, when a vertex angle θ of the prism 16a is formed between two straight lines (equilateral) of equal lengths, the symmetrical prism sheet 16 is formed so that the vertex angle θ of the prism 16a can satisfy the following Expression (3):

$$55° \leq \theta \leq 80° \quad (3)$$

(where a shape of the prism 16a is an isosceles triangle, and θ denotes a vertex angle formed between two straight lines (two sides) of equal lengths of the isosceles triangle).

In the present invention, a reason for setting of the vertex angle θ of the isosceles triangle of the prism 16a of the symmetrical prism sheet 16 to 55° or higher and 80° or lower is that front brightness can be improved as long as the vertex angle θ is within a range of satisfying Expression (3).

As illustrated in FIG. 7B, in the present invention, when a vertex angle ($\theta_1+\theta_2$) of a prism 16b of an asymmetrical prism sheet 16 is formed between two straight lines of different lengths (two sides of different lengths), the asymmetrical prism sheet 16 is formed so that the vertex angle ($\theta_1+\theta_2$) of the prism 16b can satisfy the following Expression (4):

$$0° \leq \theta_1 \leq 15° \text{ and } 30° \leq \theta_2 \leq 45° \quad (4)$$

(where $\theta_1$ denotes an angle formed between a perpendicular coupling a vertex of the vertex angle ($\theta_1+\theta_2$) of the prism 16b to a bottom of the prism 16b and one of the two straight lines of the different lengths, and $\theta_2$ denotes an angle formed between the perpendicular and the other of the two straight lines of the different lengths).

In the illustrated example, $\theta_1$ denotes the angle formed between the perpendicular coupling the vertex of the vertex angle ($\theta_1+\theta_2$) of the prism 16b to the bottom of the prism 16b (plane of prism sheet 16) and one of the straight lines of the different lengths forming the vertex angle ($\theta_1+\theta_2$), in other words, in FIG. 7B, an oblique line of the prism 16b positioned on the left side of the drawing, and $\theta_2$ denotes the angle formed between the perpendicular and the other of the straight lines of the different lengths sandwiching the vertex angle ($\theta_1+\theta_2$), in other words, in FIG. 7B, an oblique line of the prism 16b positioned on the right side of the drawing.

In the present invention, a reason for setting $\theta_1$ and $\theta_2$ forming the vertex angle ($\theta_1+\theta_2$) of the triangle of the prism

16b to 0° or higher and 15° or lower and to 30° or higher and 45° or lower, respectively, is that front brightness of the backlight 2 can be improved as long as the angles $\theta_1$ and $\theta_2$ are within a range that satisfies Expression (4).

In the conventional art, for the prism sheet, usually, a sheet on which prisms of a prism row are arranged to have convexes in a light exit direction, for example, a sheet in which vertexes of prisms of a prism row are directed in the light exit direction, and the vertex angle thereof is 90° (in the drawing, upward convex 90° (e.g., BEF by 3M)), has been used.

On the other hand, in the present invention, to simultaneously realize thinning and enlargement, by the light guide plate formed in such a manner that the light entrance planes of both ends are thin, the center portion is a thick reverse wedge in shape, and the scattering particles are dispersed therein, a light is extracted by reflection on the inclined plane of the backside and scattering inside. Thus, a direction of the light extracted from the light exit plane depends on a full-reflection condition and, if a normal direction is defined to be 0°, an emission angle of the light emitted from the light exit plane becomes an extremely large angle of 75° or higher (emitted in state of being laid in advancing direction). In consequence, in the prism sheet of the upward convex prism used by the conventional art, conversion of an outgoing light from the light guide plate into a front direction by "refraction" becomes difficult.

Thus, in the present invention, to convert an outgoing light of a large emission angle from the light guide plate into a front direction by "full reflection", a prism sheet where prisms of a prism row are arranged to have convexes (downward convexes in the drawing) in a light exit direction has to be used.

In the present invention, a prism condition of the prism sheet for efficiently converting the light exit direction into the front direction first has to satisfy a prism angle condition of Expression (3) or (4). In other words, in the present invention, the prism sheet used in combination with the reverse-wedge-shaped light guide plate containing the scattering particles dispersed therein has to satisfy the prism angle condition of Expression (3) in the case of a symmetrical (isosceles triangle prism) prism sheet, and the prism angle condition of Expression (4) in the case of an asymmetrical prism sheet.

According to the present invention, as described above, light use efficiency is increased by using the reverse-wedge-shaped light guide plate 18 containing the scattering particles dispersed therein. By using the symmetrical or asymmetrical prism sheet 16 defining the vertex angle based on the shape of the prism 16a or 16b in combination with the light guide plate, front brightness is improved by setting a direction of an outgoing light to a front direction and enhancing condensing performance, thereby improving light use efficiency and front brightness simultaneously, compared with the conventionally used upward convex prism sheet. Thus, the present invention enables simultaneous realization of light use efficiency and front brightness unachievable by the technology using the conventional light guide plate.

In the present invention, corresponding to internal scattering conditions of the light guide plate (specifically, turbidity conditions in light guide plate system) that satisfy Expressions (1) and (2), an appropriate prism angle of the prism sheet 16 for maximizing front brightness is preferably selected. In other words, the vertex angle $\theta$, $\theta_1$, or $\theta_2$ of the prism 16a or 16b of the prism sheet 16 is preferably determined according to a concentration of the scattering particles dispersed in the light guide plate 18.

Figure 8:
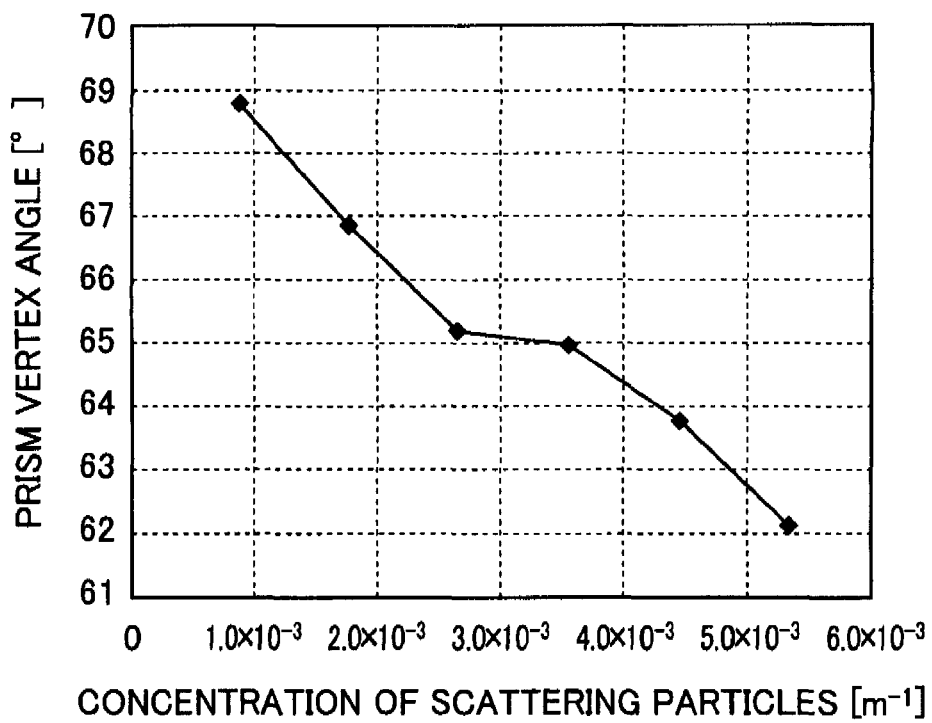
FIG. 8 is a graph illustrating a relationship between a concentration of scattering particles contained in the light guide plate and an angle of a prism vertex of the prism sheet used in the present invention.

FIG. 8 illustrates an example of a relationship between a concentration of scattering particles contained in a light guide plate used by the present invention and a vertex angle of a prism of a prism sheet.

FIG. 8 is a graph illustrating a relationship between a concentration of the scattering particles contained in the light guide plate 18 and the vertex angle $\theta$ of the prism 16a when a shape of the prism 16a of the symmetrical prism sheet 16 is an isosceles triangle, indicating presence of the vertex angle $\theta$ of the prism 16a of the symmetrical prism sheet 16 for maximizing front brightness of an outgoing light with respect to the concentration of the scattering particles contained in the light guide plate 18 to achieve high light use efficiency.

Thus, by using the symmetrical prism sheet 16 including the prism 16a of the vertex angle $\theta$ capable of maximizing front brightness in view of the graph of FIG. 8 with respect to the concentration of the scattering particles contained and dispersed in the light guide plate 18 used by the present invention, front brightness maximized with respect to high light use efficiency can be achieved.

By obtaining, beforehand, a relationship between a concentration of scattering particles in a light guide plate and a vertex angle of a prism of a prism sheet such as that illustrated in FIG. 8 for a combination of various light guide plates and various prism sheets, a vertex angle of the prism 16a of the symmetrical prism sheet 16 for maximizing front brightness to achieve maximized front brightness with respect to a concentration of the scattering particles contained in the light guide plate to achieve high light use efficiency can be obtained. Thus, high light use efficiency and high front brightness can simultaneously be achieved.

In this embodiment, the prism sheet 16 that includes a plurality of triangular prism rows satisfying Expressions (3) and (4) and arranged on the transparent resin sheet is preferably used. In addition to the prism sheet 16, other prism sheets such as a prism sheet where prism rows are formed in orthogonal directions may be used. In place of the prism sheet 16, a sheet where optical elements similar to prisms, for example, optical elements such as a lenticular lens, a concave lens, a convex lens, and a pyramid type having lens effects are regularly arranged may be used in a manner that the optical elements face the light exit plane 18a of the light guide plate 18, in other words, the optical elements are arranged downward in the drawing.

Next, the diffusion film 14 is described.

The diffusion film 14 is for maintaining high front brightness and achieving high in-plane uniformity by controlling an orientation distribution of light emitted from the prism sheet 16, and as illustrated in FIGS. 1A and 1B, arranged on a side opposite to the light guide plate 18 with respect to the prism sheet 16, in other words, closer to the polarization separator sheet 13 side than the prism sheet 16 from the light guide plate 18, i.e., close to the liquid crystal panel side 4.

In the prism sheet 16, the backside where no prism row is formed, in other words, a surface of a top side in the drawing, is planar. Thus, the diffusion film 14 is disposed to face the planar backside of the prism sheet 16, i.e., the plane of the top side in the drawing.

In the present invention, for the diffusion film 14, a diffusion film that satisfies the following diffusion condition is preferably used. According to the present invention, by using the diffusion film that satisfies the diffusion condition, an orientation distribution of outgoing light is controlled and high front brightness is maintained, thereby achieving high in-plane uniformity.

Figure 9:
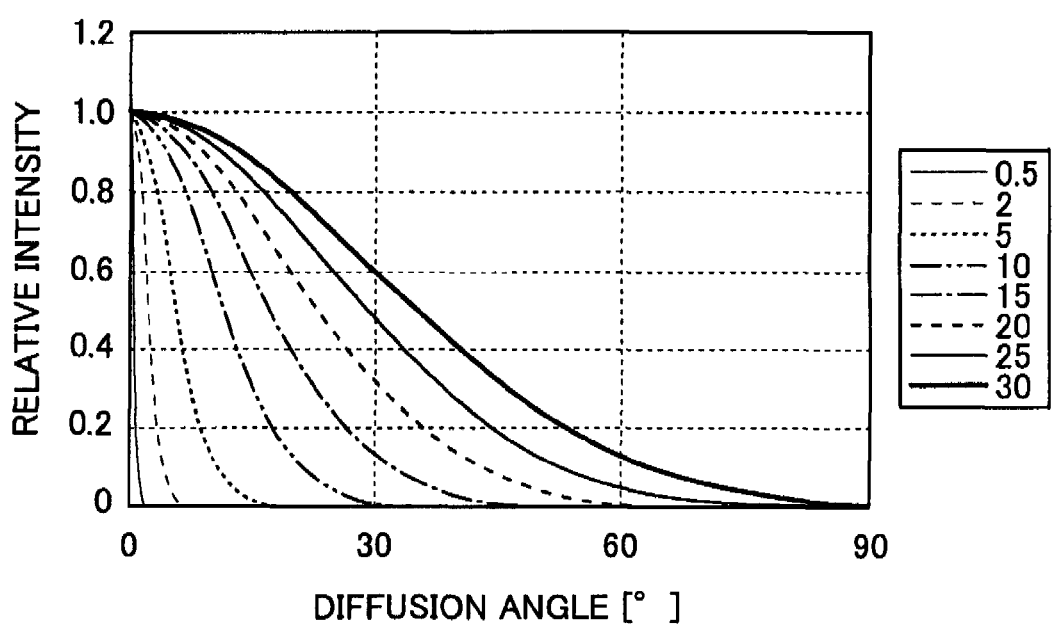
FIG. 9 is a graph illustrating a relationship between a diffusion angle of a diffusion film used in the present invention and relative intensity.

First, when a ray having intensity $P_0$ passes through the diffusion film 14, intensity $P(\phi)$ of a transmitted diffused light at a diffusion angle $\phi$ can be represented by the following Expression (5). Expression (5) can be represented as relative intensity $P(\phi)/P_0$ of a transmitted diffused light where a diffusion angle standard deviation $\sigma$ is a parameter as illustrated in FIG. 9.

[Equation 4]

$$P(\phi) = P_0 \exp\left[-\frac{1}{2} \cdot \left(\frac{\phi}{\sigma}\right)^2\right] \quad (5)$$

(In Expression (5), $\phi$ denotes a diffusion angle or an emission angle, and $\sigma$ denotes a diffusion angle standard deviation).

In this case, for the diffusion condition of the diffusion film 14 used by the present invention, a preferable condition is that an orientation distribution of outgoing light when the diffusion film 14 is combined with the reverse-wedge-shaped light guide plate 18 containing the scattering particles dispersed therein is gradually reduced in intensity as an angle becomes wider from the front. Accordingly, an orientation distribution where intensity of an outgoing light is minimum or maximum at a certain angle is not a preferable condition.

Thus, when an intensity distribution of outgoing light when the diffusion film 14 satisfying Expression (5) is combined with the reverse-wedge-shaped light guide plate 18 containing the scattering particles dispersed therein is denoted by $L(\phi)[cd/m^2]$, a diffusion condition can be represented by the following Expression (6) using an orientation evaluation parameter $S(\sigma)$. For a diffusion condition required by the diffusion film 14 of the present invention, the orientation evaluation parameter $S(\sigma)$ preferably satisfies the following Expression (7).

[Equation 5]

$$S(\sigma) = \int_0^{\pi/2} \left|\frac{d^2(L(\phi, \sigma))}{d\phi^2}\right| d\phi \quad (6)$$

$$0 \leq S \leq 20 \quad (7)$$

(in Expression (6), $\phi$ denotes a diffusion angle or an emission angle, and $\sigma$ denotes a diffusion angle standard deviation).

The intensity distribution $L(\phi)$ of an outgoing light is an emission brightness distribution from a planar lighting unit using the light guide plate assembly which includes, as a unit, the reverse-wedge-shaped light guide plate 18 containing the scattering particles dispersed therein, the downward-convex prism sheet 16, and the diffusion film 14, for example, an emission brightness distribution from the planar lighting unit evaluated by a brightness meter. Specifically, an intensity distribution $L(\phi)$ of an outgoing light is given in a form of discrete numerical value data obtained by measuring an angle distribution from −90° to 90° for certain angles, for example, for every 1°, 5°, and 10°, by the brightness meter such as a commercially available color brightness meter such as BM-7fast by Topcon Corporation. Thus, when the orientation evaluation parameter $S(\sigma)$ is obtained by Expression (6), a numerical value of an emission brightness distribution from the planar lighting unit when a diffusion film having a diffusion angle standard deviation $\sigma$ set to a predetermined value (diffusion degree) is used only needs to be calculated by using a numerical value measured according to an angle distribution, or a function Expression representing an intensity distribution $L(\phi)$ of an outgoing light is approximated from a measured brightness value, and Expression (6) only needs to be calculated by using the obtained function Expression.

In other words, according to the present invention, the brightness distribution of light emitted from the planar lighting unit is evaluated and, depending on whether the orientation evaluation parameter $S(\sigma)$ thus obtained satisfies Expression (7), intensity of an outgoing light can be gradually reduced from the front to a wider angle. In short, whether a light guide plate assembly for emitting a light with no feeling of brightness or darkness, and a planar lighting device using this can be realized can be judged.

Figure 10:
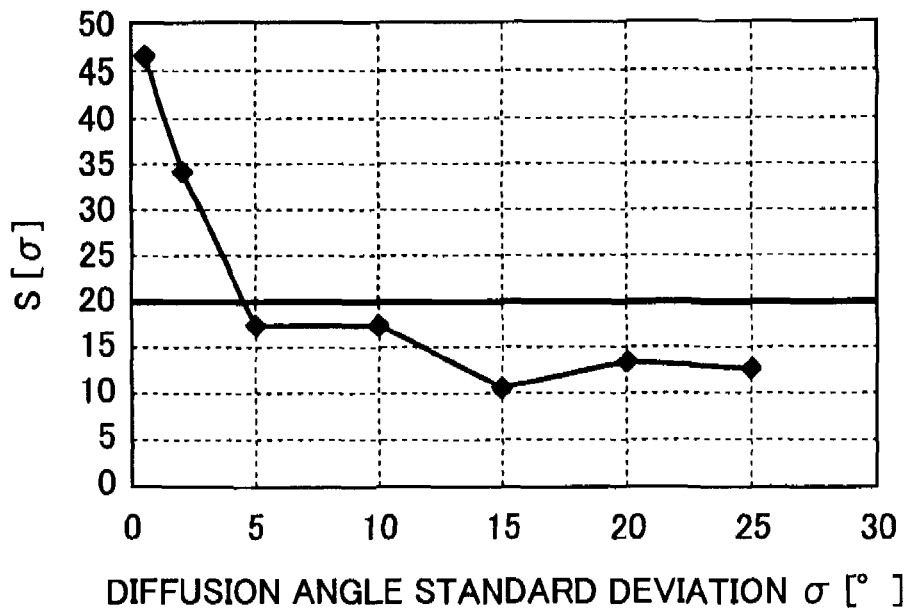
FIG. 10 is a graph illustrating a relationship between an orientation evaluation parameter $S(\sigma)$ for evaluating a diffusion condition of the diffusion film used in the present invention and a diffusion angle standard deviation $\sigma$.

A graph of a relationship between the orientation evaluation parameter $S(\sigma)$ and the diffusion angle standard deviation $\sigma$ represented by Expression (6) can be as illustrated in FIG. 10. FIG. 10 illustrates the orientation evaluation parameter $S(\sigma)$ when a diffusion condition of a diffusion film is changed. By changing the diffusion condition of the diffusion film, the orientation evaluation parameter $S(\sigma)$ can be controlled, whereby an orientation distribution of outgoing light by the diffusion film can be suitably set.

Figure 11:
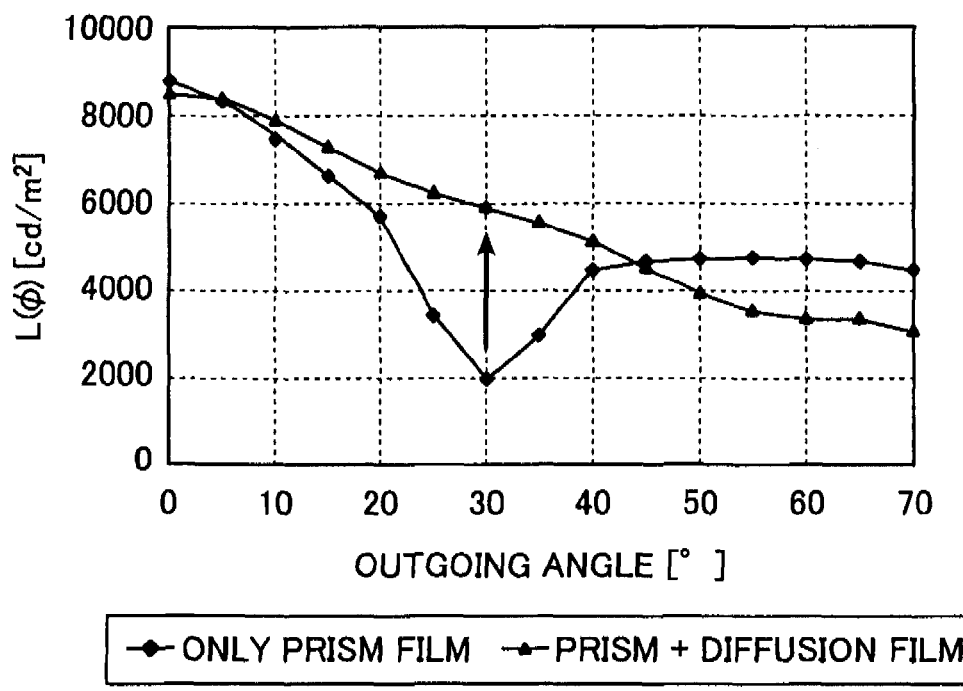
FIG. 11 is a graph illustrating a relationship between an outgoing intensity light distribution $L(\phi)$ and an emission angle, representing an effect of combining the prism sheet and the diffusion film used in the present invention.

FIG. 11 illustrates an example of an orientation distribution of outgoing light when the prism sheet 16 and the diffusion film 14 are used. For example, in the example of FIG. 11, only by the prism sheet 16, near a visual field angle of 30°, brightness, in other words, intensity of an outgoing light, may drop to generate a dark line, which is not preferable as the function of the planar lighting device. Even in such a case, however, by using a diffusion film where a diffusion angle standard deviation $\sigma$ is 10 as a diffusion condition, an orientation distribution can be improved.

The use of such a diffusion film 14 enables gradual reduction of the intensity distribution of the outgoing light from the front as the angle becomes wider, in other words, emission of a light giving no feeling of brightness or darkness.

The inventors of the present invention made a comparison, by using the light sources 12a and 12b, light guide plate 18, and light mixers 20a and 20b of the backlight unit 2 illustrated in FIGS. 1A and 1B, of obtained light use efficiency and front brightness by varying a configuration of the prism sheet from a normally used symmetrical prism sheet of an upward convex vertex angle θ90° (BEF By 3M) as Comparative Example 11 to a symmetrical prism sheet 16 of a downward convex vertex angle θ60° of the present invention as Example 11, and an asymmetrical prism sheet 16 of a downward convex vertex angle ($\theta_1+\theta_2$) (10°+30°) of the present invention as Example 12.

Table 2 shows a result. Light use efficiency represents efficiency standardized by a numerical value of Comparative Example 11.

The light guide plates 18 used in the respective examples are similar, and shapes and scattering conditions therein are integrated. For scattering particles, silicone-resin fine particles are used.

TABLE 2

| | Light use efficiency | Front brightness | Overall judgment |
| --- | --- | --- | --- |
| Example 11 | 1.02 | 9,480 cd/m$^2$ | Good |
| Example 12 | 1.12 | 9,620 cd/m$^2$ | Excellent |
| Comparative Example 11 | 1.00 | 7,720 cd/m$^2$ | Poor |

A result of Table 2 shows that Examples 11 and 12 enhance front brightness without reducing light use efficiency as compared with Comparative Example 11. In other words, the prism sheets 16 used in Examples 11 and 12 can enhance front brightness without reducing light use efficiency as compared with the prism sheet used in Comparative Example 11. Especially, the prism sheet 16 used in Example 12 can increase, as compared with the prism sheet used in Comparative Example 11, light use efficiency and greatly enhance front brightness.

The diffusion film 14 is formed of a material in the form of film given a light diffusing property. The material in the form of film may be formed, for example, of an optically transparent resin such as polyethylene terephthalate (PET), polypropylene (PP), polycarbonate (PC), polymethyl methacrylate (PMMA), benzyl methacrylate, MS resin, or cycloolefin polymer (COP).

The method of forming the diffusion film 14 is not limited specifically. For example, a surface of the material in the form of film may be machined to form a fine asperity thereon or roughened by grinding thereby to provide a light diffusing property. The diffusion film may be alternatively formed by coating its surface with a material that diffuses light as exemplified by silica; pigments such as titanium oxide and zinc oxide; a resin; and beads of glass, zirconia, etc., together with a binder, or by kneading the above-mentioned pigments or beads having a light diffusing property into the above-mentioned transparent resin. Materials having a high reflectance and a low light-absorbing property such as metals as exemplified by Ag and Al may also be used to form the diffusion film 14.

In the present invention, a diffusion film of a matte type or a coating type may be used as the diffusion film 14.

The diffusion film 14 may be directly mounted on the planar backside of the prism sheet 16, or disposed away from the planar backside by a predetermined distance. As a result, the diffusion film 14 is disposed away by a certain distance from the light exit plane 18a of the light guide plate 18 by interpolating the prism sheet 16 therebetween. This distance can be changed appropriately according to a light amount distribution from the light exit plane 18a of the light guide plate 18.

Thus, by interpolating the prism sheet 16, the diffusion film 14 is disposed away by a predetermined distance from the light exit plane 18a of the light guide plate 18, whereby light emitted from the light exit plane 18a of the light guide plate 18 is further mixed among the light exit plane 18a, the prism sheet 16, and the diffusion film 14. As a result, brightness of a light passed through the diffusion film 14 to illuminate the liquid crystal display panel 4 can be made more uniform.

As a method of separating the prism sheet 16 and the diffusion film 14 by predetermined distances from the light exit plane 18a of the light guide plate 18, for example, a method of disposing spacers between the diffusion film 14/prism sheet 16 and the light guide plate 18 or between the prism sheet 16 and the diffusion film 14 can be used.

In the present invention, the backside of the prism sheet 16 is planar because the prism rows of the prism sheet 16 face the light exit plane 18a of the light guide plate 18. Accordingly, a diffusion layer having a diffusion function similar to that of the diffusion film 14, in other words, a diffusion layer having diffusion conditions which satisfy Expressions (5), (6) and (7), may be directly formed on the planar backside of the prism sheet 16, and the diffusion layer may be integrated with the prism sheet 16. For this diffusion layer, a base of the prism sheet 16 is formed by a transparent resin sheet, and diffusibility is provided to the planar backside of the transparent resin sheet by the above-mentioned method.

Thus, by using the prism and diffusion composite sheet (film) formed by integrating the prism sheet 16 and the diffusion layer, an orientation distribution of outgoing light is controlled, whereby the number of components can be reduced while maintaining high front brightness and high in-plane uniformity, and costs can be reduced.

Next, the polarization separator film 13 is described.

The polarization separator film 13 is capable of selectively transmitting a given polarized component, e.g., p-polarized component, of light emitted through the light exit plane of the diffusion film 14 and reflecting almost all of the other polarized components, e.g., s-polarized component. As illustrated in FIGS. 1A and 1B, the polarization separator film 13 is disposed on the light exit plane side of the diffusion film 14 and hence between the diffusion film 14 and the liquid crystal panel 4, in other words, on an opposite side of the diffusion film 14 from the light guide plate 18 (prism sheet 16). In this case, the polarization separator film 13 reflects light and caused the light to reenter the light guide plate 18 so that the light can be reused, which greatly increases light use efficiency and enhances brightness. The polarization separator film 13 may, for example, be obtained by kneading and dispersing acicular particles into a transparent resin and stretching a resultant sheet material to orient the acicular particles in a given direction. A publicly-known polarization separator film can be used as the polarization separator film 13.

In the illustrated example, the polarization separator film 13 is disposed on the light exit side of the diffusion film 14. However, the present invention is not limited to this. The polarization separator film 13 may be disposed directly on the light exit plane 18a of the light guide plate 18, or a polarization separator layer having a similar polarization separator function may be formed directly on the light exit plane 18a of the light guide plate 18. When the polarization separator layer is directly formed on the light exit plane 18a of the light guide plate 18 to be integrated, during manufacturing of the light guide plate 18, the polarization separator layer is preferably crimped or fused to the light exit plane 18a to be integrated. In this way, the light exit plane 18a of the light guide plate 18 and the polarization separator layer can be bonded together without interpolating any air therebetween.

When the polarization separator layer is formed on the light exit plane 18a of the light guide plate 18 in the manner of being integrated, a prism sheet 16 and a diffusion film 14 or a prism sheet 16 including a diffusion layer formed on its backside are/is arranged toward the outside, in other words, toward the liquid crystal panel 4 side.

Thus, by using the light guide plate 18 which includes the polarization separator layer integrally formed on the light exit plane 18a of the light guide plate 18, the number of components can be reduced, and costs can be reduced.

Next, the reflection sheet 22 of the backlight unit 2 is described.

The reflection sheet 22 is provided to reflect light leaking through the inclined planes 18b and 18c of the light guide plate 18 to make the light enter the light guide plate 18 again as illustrated in FIGS. 1A and 1B, thereby making it possible to enhance the light use efficiency. The reflection sheet 22 is formed to cover the opposite planes of the inclined planes 18b and 18c of the light guide plate 18.

The reflection sheet 22 may be formed of any material in any shape such as a sheet shape, and a plate shape as long as being capable of reflecting light leaking through the inclined plane 18b and the opposite plane of the light entrance plane 18c of the light guide plate 18. The reflection sheet 22 may be formed as a reflection sheet or a reflection plate, for example, of: a resin sheet formed by kneading PET, polypropylene (PP), etc. with a filler and then stretching a resultant mixture to form voids therein thereby to increase the reflectance; a sheet formed by depositing aluminum vapor to form a specular surface on the surface of a transparent resin sheet or a white resin sheet; a metal foil such as an aluminum foil or a resin sheet carrying a metal foil; and a metal thin plate having sufficient reflective property on the surface thereof.

The light guide plate unit and the planar lighting device (backlight unit) of the present invention are basically configured as described above.

The components of the backlight unit 2 and the liquid crystal display device 10 of this embodiment including the light guide plate 18, the prism sheet 16, the diffusion sheet 14, the polarization separator film 13, and the light sources 12a and 12b have been described in detail. However, the present invention is not limited to these.

For example, in this embodiment, for each of the light sources 12a and 12b, the LED array 24 where the white LED chips 25 for converting a light emitted from the LED into a white light by using a fluorescent material are arranged in the array shape is used. In place of the LED chip 25, however, a white LED element where primary independent three colors such as red (R), green (G), and blue (B), in other words, single-color LEDs of three primary colors, are integrated into one element, or a white LED chip where they are integrated into one chip may be used. In place of the LED array 24, many sets of LEDs, each set being configured by combining single-color LED elements of primary independent three colors and arranging them close to one another to generate a white color, may be arrayed to be used as an LED array.

For example, by using LED elements of three colors of R, G and B (simply referred to as LEDs hereinafter), light emitted from the LEDs may be mixed by the coupling lens to obtain a white color light.

Figure 12:
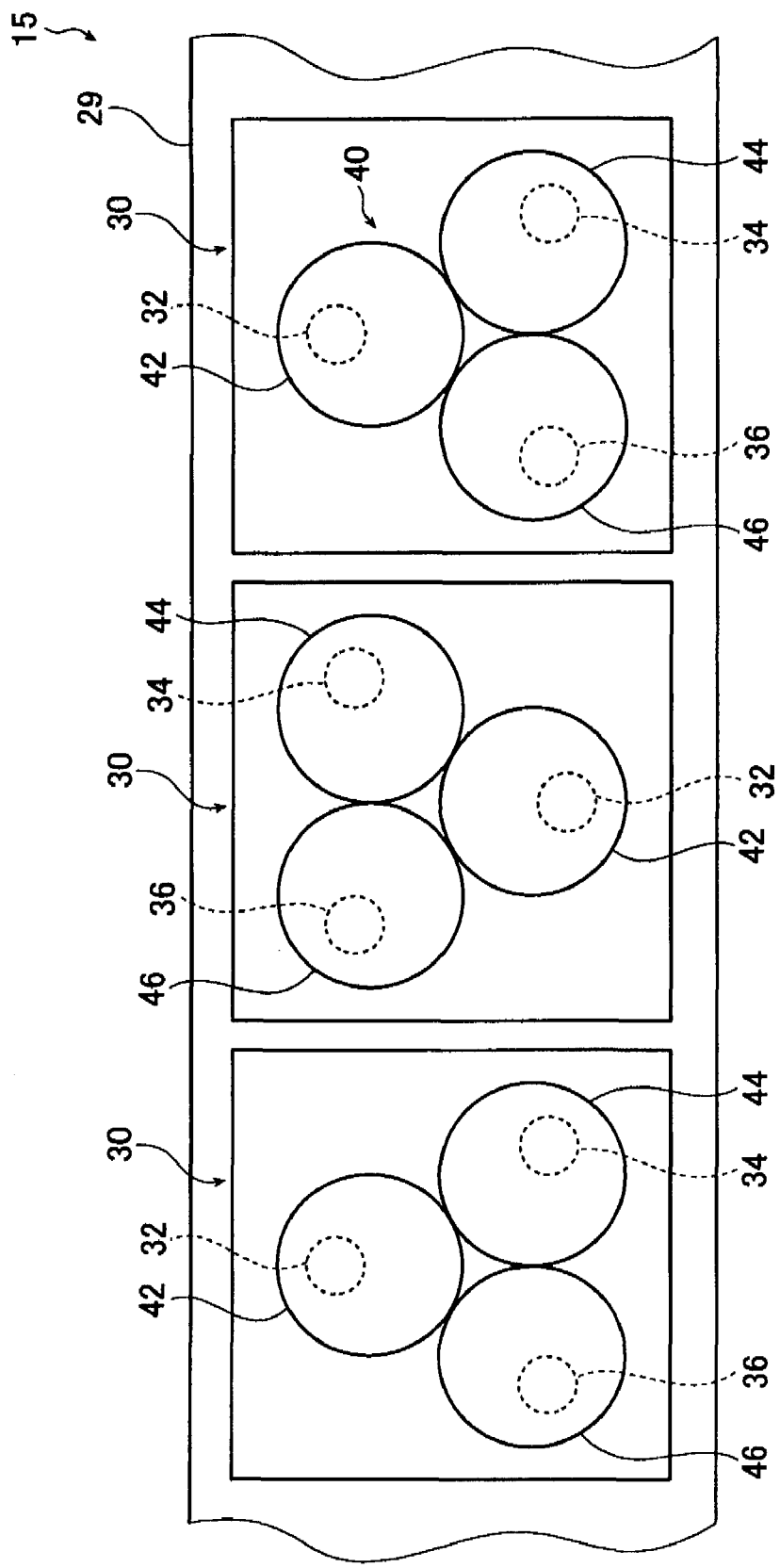
FIG. 12 is a schematic configuration view of a light source using three-color LEDs used in the present invention.

Now, an example of a light source using three colors of LEDs is described below. FIG. 12 is a schematic view illustrating a configuration of the light source using LEDs of three colors.

A light source 15 is used in place of the light sources 12a and 12b of FIG. 1, and includes an LED array 29 and coupling lenses 40 as illustrated in FIG. 12.

The LED array 29 is configured by a plurality of RGB-LEDs 30 arranged in a row, each RGB-LED 30 being formed using three different light emitting diodes of R, G, and B, i.e., R-LED 32, G-LED 34, and B-LED 36. FIG. 12 schematically illustrates how the plurality of RGB-LEDs 30 are arranged. The R-LED 32, the G-LED 34, and the B-LED 36 are combined with one another in an equilateral triangle for one RGB-LED 30, and are regularly arranged so as to make a combination in which equilateral triangles are each alternately directed in an opposite direction in the LED array 29 as illustrated in FIG. 12.

Figure 13:
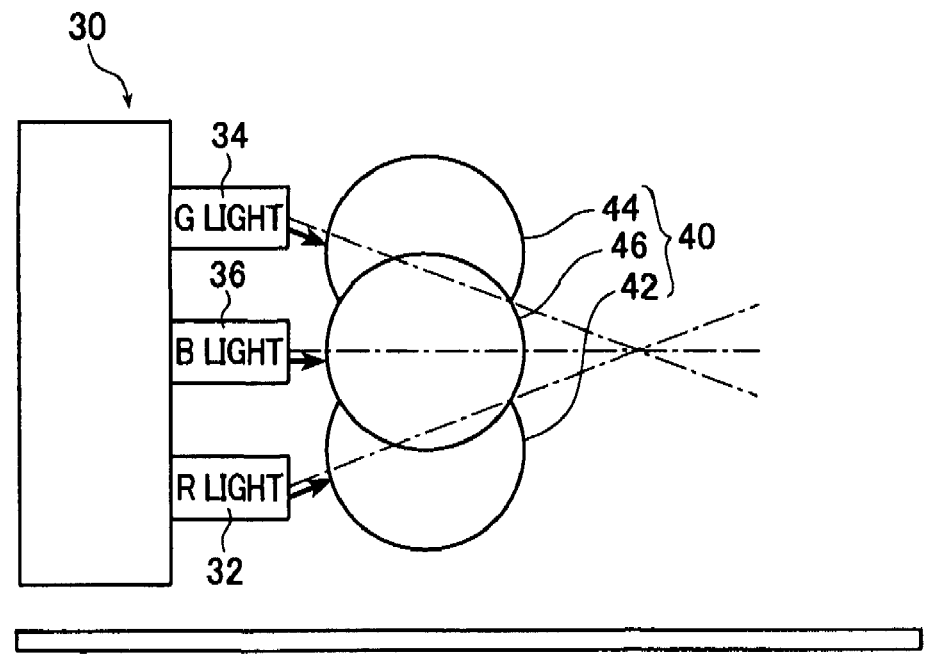
FIG. 13 is a view schematically illustrating an arranging state of a plurality of sets of RGB-LEDs used in the present invention.

In each RGB-LED 30, the directions of the optical axes of the three kinds of LEDs (R-LED 32, G-LED 34, and B-LED 36) are adjusted as illustrated in FIG. 13 such that light beams leaving the R-LED 32, the G-LED 34, and the B-LED 36 cross one another at a given position. The three kinds of LEDs are thus adjusted, and the light beams from the LEDs are mixed to become white light.

The RGB-LED 30 configured using LEDs representing three primary colors (R-LED 32, G-LED 34, and B-LED 36) and the LED chips (white LED) 25 achieve a wide range of color reproduction and a high color purity as compared with cold cathode tubes (CCFL) conventionally used as a light source for a backlight. Therefore, when the RGB-LED 30 or the LED chip 25 are used as a light source for a backlight, color reproduction is improved over the conventional case and images can be displayed in vivid color representation.

As illustrated in FIGS. 12 and 13, three ball lenses 42, 44, and 46 are disposed as the coupling lens 40 on the light exit side of the individual LEDs 32, 34, and 36 of R, G, and B of the RGB-LED 30. The ball lenses 42, 44, and 46 are disposed for the respective LEDs 32, 34, and 36 of R, G, and B. Specifically, the three ball lenses 42, 44, and 46 are combined with one another for one RGB-LED 30 for use. Light beams leaving the R-LED 32, the G-LED 34, and the B-LED 36 are each collimated by the ball lenses 42, 44, and 46. The light beams then cross one another at a given position to be mixed into white light and enter the light mixers 20a and 20b of the light guide plate 18. The coupling lens using the three ball lenses 42, 44, and 46 in combination is a lens having three axes, whereby light beams leaving the LEDs 32, 34, and 36 of the RGB-LED 30 can be mixed such that the light beams meet at one point to become white light.

Instead of providing the LED array so as to face the light entrance planes 18b and 18c of the light guide plate 18, light guides may be used to lead light emitted by the LEDs or the LED chips of the LED array to the light guide plate. The light guides may be formed, for example, of optical fibers or light guide paths made of a transparent resin.

When the LED array is used as a light source and located close to a lateral plane of the light guide plate 18, there is a fear that heat generated by the LEDs forming the LED array may deform or melt the light guide plate 18. Deformation and melting of the light guide plate 18 due to the heat generated by the LEDs, however, can be prevented by locating the LED array away from the lateral plane of the light guide plate 18 and leading light emitted by the LEDs to the light guide plate 18 through the light guides.

In the respective embodiments, the LED array 24 using the LED chips 25 or the like and the LED array 29 including the plurality of sets of RGB-LEDs 30 are used. However, the present invention is not limited to these. As long as Expression (8) is satisfied, in place of the LEDs or the LED array, LDs or an LD array may be used completely in a similar manner.

Additionally, for the light source 12, various light sources such as a fluorescent tube, a cold cathode tube, a hot cathode tube, and an external electrode tube can be used. In the present invention, however, LEDs or LDs are preferably used.

In this embodiment, as the light guide plate, the reverse-wedge-shaped light guide plate 18 made of the transparent resin containing the scattering particles dispersed therein, having the rectangular light exit plane, thin ends at both sides, and the thickest center portion, and inclined to both sides thereof is used. However, the present invention is not limited to this. As long as Expressions (1) and (2) are satisfied, the light guide plate may be processed in various manners, plasticized to be flexible, or different in shape.

Figure 14:
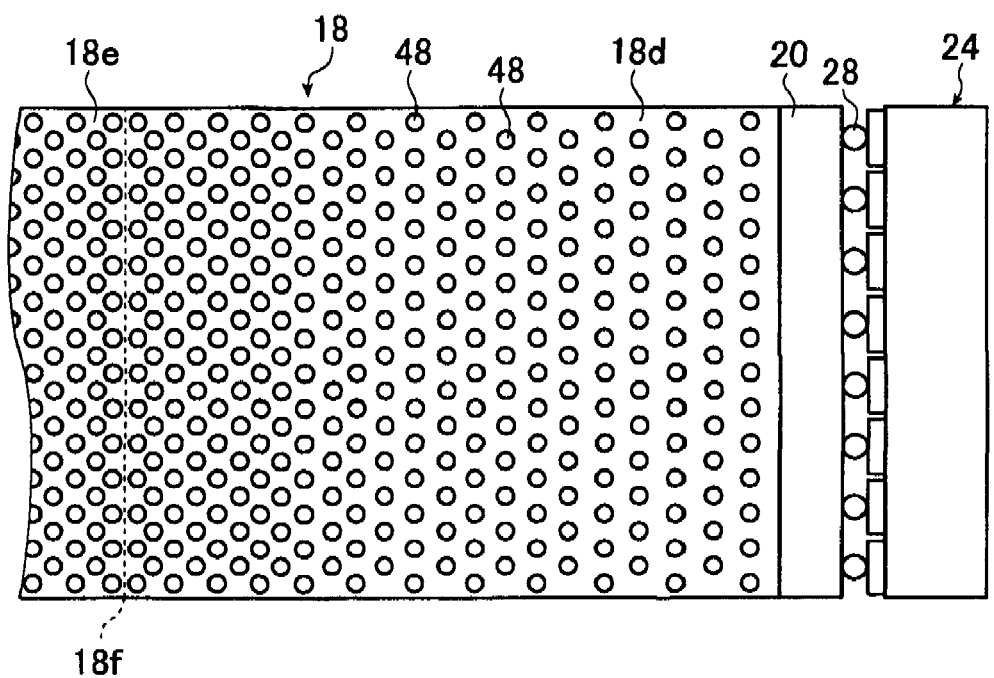
FIG. 14 is a schematic top view of a light guide plate including a diffusion reflector printed in an inclined plane according to another embodiment of the present invention and a light source used in the present invention.

For example, as illustrated in FIG. 14, a plurality of diffusion reflectors 48 may be formed by printing, for example, on the inclined planes 18d and 18e of the light guide plate 18 in a given pattern, specifically in such a pattern that the density is low on the sides closer to the light entrance planes 18b and 18c of the light guide plate 18, growing gradually higher from the light entrance planes 18b and 18c toward the center ridge-line 18f. Such diffusion reflectors 48 formed on the inclined planes 18d and 18e of the light guide plate 18 in a given pattern limit generation of bright lines or unevenness in the light exit plane 18a of the light guide plate 18. Further, instead of printing the diffusion reflectors 48 on the inclined planes 18d and 18e of the light guide plate 18, a thin sheet having the diffusion reflectors 48 formed thereon in a given pattern may be disposed between the inclined planes 18d and 18e of the light guide plate 18 and the reflection sheet 22. The diffusion reflectors 48 may each have an arbitrary shape such as a rectangle, a polygon, a circle, and an ellipse.

The diffusion reflectors may be formed, for example, by applying a material for scattering light as exemplified by: silica; pigments such as titanium oxide and zinc oxide; a resin; and beads of glass, zirconia, etc., together with a binder, or may be a pattern created by machining the surface to form an asperity thereon or by grinding to roughen the surface. Otherwise, a material having a high reflectance and a low light-absorbing property such as metals as exemplified by Ag and Al may be used. Ordinary white ink as used in screen printing, offset printing, etc., to form diffusion reflectors may be used. For example, ink obtained by dispersing titanium oxide, zinc oxide, zinc sulfate, barium sulfate, or the like into acrylic binder, polyester binder, vinyl chloride binder, or the like, or ink given a diffusing property by mixing titanium oxide with silica may be used.

While the diffusion reflectors are distributed to have a density that increases with the increasing distance from the light entrance plane in this embodiment, the present invention is not limited thereto and may be determined as appropriate according to the intensity or distribution of bright lines, brightness distribution required of outgoing light, etc. The diffusion reflectors, for example, may be distributed evenly on the entire surface of the inclined planes or at a density that decreases with the increasing distance from the light entrance plane. Further, instead of providing the diffusion reflectors by printing, the locations corresponding to the diffusion reflectors may be roughened to provide sand-rubbed surfaces.

While the diffusion reflectors are provided on the inclined plane in the light guide plate of FIG. 14, the present invention is not limited thereto and the diffusion reflectors may be provided on an arbitrary plane as desired except the light entrance plane. For example, the diffusion reflectors may be provided on the light exit plane or on the inclined plane and the plane opposite to the light entrance plane.

The light guide plate 18 may be fabricated by mixing a plasticizer into the transparent resin to make the light guide plate 18 flexible.

Fabricating the light guide plate from a material thus prepared by mixing a transparent resin and a plasticizer makes the light guide plate 18 flexible, i.e., provides a flexible light guide plate 18, allowing the light guide plate 18 to be deformed into various shapes. In particular, further thinning the light guide plate 18 can make the light guide plate 18 more flexible. Accordingly, the surface of the light guide plate 18 can be formed into various curved surfaces.

When the light guide plate 18 is given such flexibility and a flexible liquid crystal are combined together, a flexible LCD monitor or a flexible television (TV) can be provided. Further, the flexible light guide plate 18 or planar lighting device using the light guide plate 18 can even be mounted to a wall having a curvature when used, for example, for a display board employing ornamental lighting (illuminations). Accordingly, the light guide plate 18 can be used for a wider variety of applications and in a wider application range including ornamental lighting and point-of-purchase (POP) advertising.

The plasticizer is exemplified by phthalic acid esters, specifically, dimethyl phthalate (DMP), diethyl phthalate (DEP), dibutyl phthalate (DBP), di(2-ethylhexyl)phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, the plasticizer is also exemplified by dioctyl adipate (DOA), diisononyl adipate (DINA), dinormal alkyl adipate ($C_{6, 8, 10}$) (610A), dialkyl adipate ($C_{7, 9}$) (79A), dioctyl azelate (DOZ), dibutyl sebacate(DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

In this embodiment, as the light guide plate, the reverse-wedge-shaped light guide plate (both-side inclined light guide plate) 18 including the light entrance planes 18*b* and 18*c* with the thinnest thickness in opposing both side ends (two sides) of the rectangular light exit plane 18*a*, the center ridgeline 18*f* formed on the thickest center portion of both, and the inclined planes 18*d* and 18*e* disposed in both sides, and inclined to both sides is used. However, the present invention is not limited to this. In place of the both-side inclined light guide plate 18, a one-side inclined light guide plate including one light entrance plane with the thinnest thickness only in one side end (one side) of a rectangular light exit plane, made gradually thicker from the light entrance plane to the opposing other end plane and thickest in the other end plane, and including one inclined plane between the light entrance plane and the other end plane may be used. A pyramidal light guide plate including four light entrance planes with the thinnest thickness at four side ends (four sides) of a rectangular light exit plane, made gradually thicker from the four light entrance planes to the center and thickest at an intersection point (center), and including four inclined planes between the four light entrance planes and the intersection point may be used.

Figure 15:
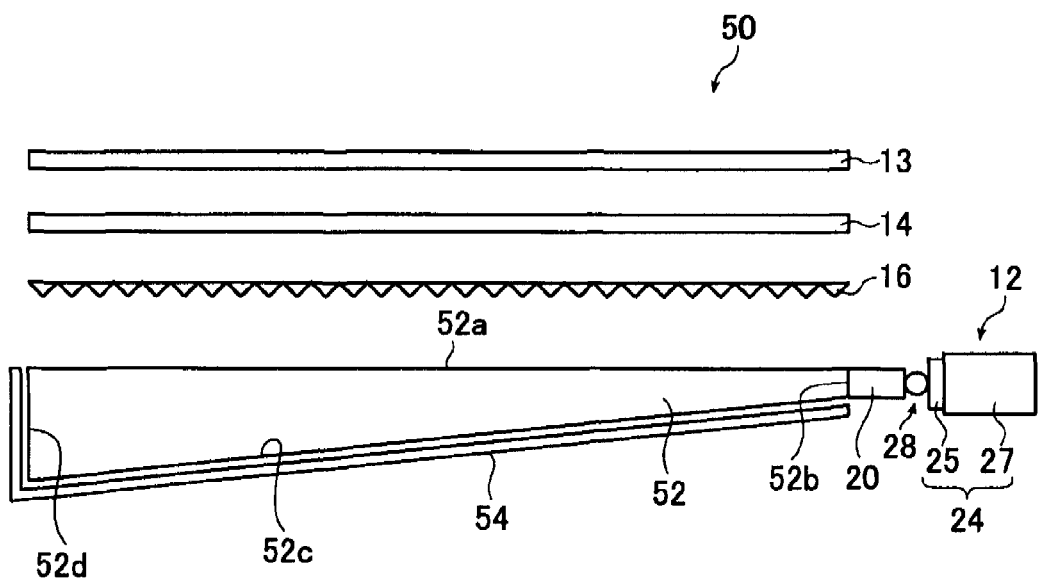
FIG. 15 is a schematic configuration sectional view of a planar lighting device according to another embodiment of the present invention.

FIG. 15 illustrates a backlight unit using a one-side inclined light guide plate which is another embodiment of the present invention.

A backlight unit 50 illustrated in FIG. 15 has a configuration similar to that of the backlight unit 2 illustrated in FIGS. 1A and 1B except for a difference in shape of the light guide plate and a reflection sheet and disposition of a light source and a light mixer only in one side. Thus, similar components are denoted by similar reference symbols, and detailed description thereof is omitted. Identical components are denoted by identical reference symbols, and description thereof is omitted.

As illustrated in FIG. 15, the backlight unit 50 of this embodiment includes a light source 12, a polarization separator film 13, a diffusion film 14, a prism sheet 16, a light guide plate 52, a light mixer 20, and a reflection sheet 54.

For the light source 12, the same one as that of each of the light sources 12*a* and 12*b* can be used. For the light mixer 20, the same one as that of each of the light mixers 20*a* and 20*b* can be used.

As illustrated in FIG. 15, the light guide plate 52 includes a substantially rectangular flat light exit plane 52*a*, one light entrance plane 52*b* disposed in one end of the rectangular light exit plane 52*a*, in other words, in a manner of being substantially orthogonal to the light exit plane 52*a* in one side, and an inclined plane 52*c* positioned on a side opposite to the light exit plane 52*a* and inclined at a predetermined angle to the light exit plane 52*a*. The light guide plate 52 is made gradually thicker as becoming farther from the light entrance plane 52*b*, the thickness at the light entrance plane 52*c* is thinnest, and a lateral end plane 52*d* opposite to the light entrance plane 52*c* is thickest. In this light guide plate 52, needless to say, there is no particular limitation on an inclined angle of the inclined plane 52*c* with respect to the light exit plane 52*a*. LED arrays 24 of the light source 12 are disposed to face the light entrance plane 52*b*, and light from the LED arrays 24 of the light source 12 is entered via the light mixer 20.

The reflection sheet 54 is disposed to cover the inclined plane 52*c* and the other end plane 52*d* of the light guide plate 52.

Accordingly, in the light guide plate 52 illustrated in FIG. 15, a light incoming from the light entrance plane 52a is scattered by the scattering particles contained in the light guide plate 52, passed through the light guide plate 52 directly or while being scattered, reflected on the inclined plane 52c, and then emitted from the light exit plane 52a. In this case, a part of the light may leak from the inclined plane 52c or the other end plane 52d. The leaked light is reflected on the reflection sheet 54 to enter the light guide plate 52 again.

The light guide plate 52 and the reflection sheet 54 are different from the light guide plate 18 and the reflection sheet 22 only in structure and shape. For functions and materials other than the structures and the shapes, similar components may be used.

Thus, the light guide plate 52 and the backlight unit 50 illustrated in FIG. 15 have functions similar to those of the light guide plate 18 and the backlight unit 2 illustrated in FIG. 1 and FIG. 2, and provide similar effects.

Figure 16:
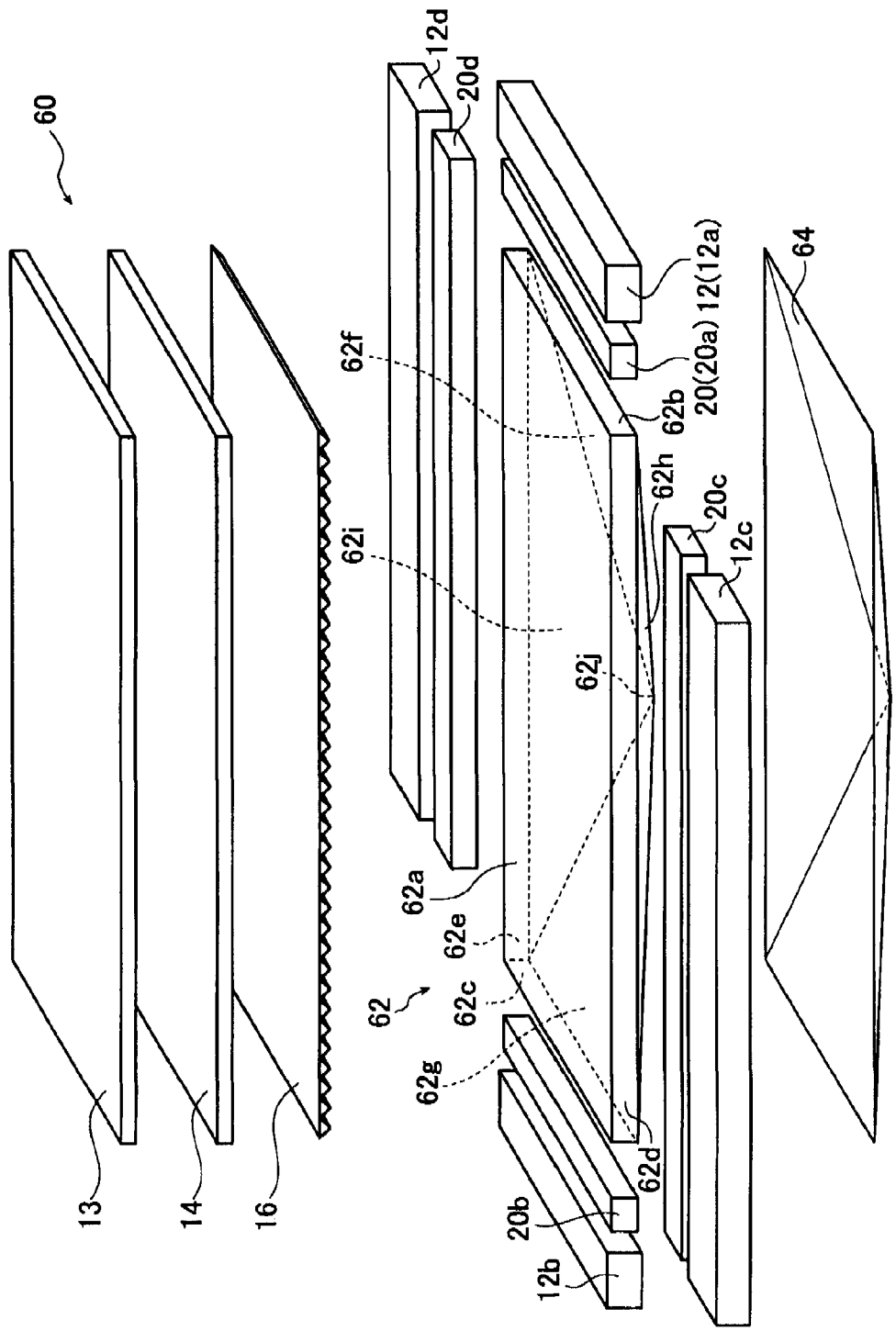
FIG. 16 is a schematic configuration sectional view of a planar lighting device according to still another embodiment of the present invention.

FIG. 16 illustrates a backlight unit using a pyramidal light guide plate which is another embodiment of the planar lighting device of the second aspect of the present invention. The backlight unit illustrated in FIG. 16 is, as described below in detail, configured by applying the pyramidal light guide plate which is an embodiment of a light guide plate of a third aspect of the present invention to the planar lighting device of the second aspect of the present invention.

A backlight unit 60 illustrated in FIG. 16 has a configuration similar to that of the backlight unit 2 illustrated in FIGS. 1A and 1B except for a difference in shape of the light guide plate and a reflection sheet and disposition of light sources and light mixers in four side ends (four sides) of a rectangular light exit plane. Thus, similar components are denoted by similar reference symbols, and detailed description thereof is omitted. Identical components are denoted by identical reference symbols, and description thereof is omitted.

As illustrated in FIG. 16, the backlight unit 60 of this embodiment includes light sources 12 (12a, 12b, 12c, and 12d), a polarization separator film 13, a diffusion film 14, a prism sheet 16, a light guide plate 62, light mixers 20a, 20b, 20c, and 20d, and a reflection sheet 64.

For the light sources 12a, 12b, 12c, and 12d, the same ones as those of the light sources 12a and 12b illustrated in FIG. 1 can be used. For the light mixers 20a, 20b, 20c, and 20d, the same ones as those of the light mixers 20a and 20b can be used.

As illustrated in FIG. 16, the light guide plate 62 includes a substantially rectangular flat light exit plane 62a, two sets of two light entrance planes, i.e., four light entrance planes 62b, 62c, 62d and 62e, disposed to be substantially orthogonal to the light exit plane 62a and to face each other in two sets of opposing two ends of the rectangular light exit plane 62a, i.e., four side ends, in other words, four sides, and inclined planes 62f, 62g, 62h, and 62i positioned on a side opposite to the light exit plane 62a and inclined at predetermined angles to the light exit plane 62a from the four light entrance planes 62b, 62c, 62d and 62e to a center (intersection point).

Thus, the inclined planes 62f, 62g, 62h, and 62i are substantially isosceles triangles in shape, inclined with respect to the light exit plane 62a so that the light guide plate 62 in a direction orthogonal to the light exit plane 62a is made gradually thicker as becoming away from the light entrance planes 62b, 62c, 62d, and 62e toward the center, and intersect one another at the center (intersection point) of the light guide plate 62 to form an intersection point 62j. As a result, the light guide plate 62 has a quadrangular pyramid shape where the light guide plate 62 is thinnest at the four light entrance planes 62b, 62c, 62d and 62e, and made gradually thicker toward the intersection point 62j and thickest (maximum thickness) at the intersection point 62j. In other words, the four inclined planes 62f, 62g, 62h, and 62i constitute a quadrangular pyramid backside 62k with respect to the substantially rectangular flat light exit plane 62a. In this light guide plate 62, needless to say, there is no particular limitation on inclined angles of the inclined planes 62f, 62g, 62h and 62i with respect to the light exit plane 62a.

LED arrays 24 of the light sources 12 are disposed to face the four light entrance planes 62b, 62c, 62d, and 62e, and light emitted from the LED arrays 24 of the light sources 12a, 12b, 12c and 12d is entered via the light mixers 20a, 20b, 20c, and 20d.

In the intersection point 62j of the backside of the light guide plate 62, the four inclined planes 62f, 62g, 62h and 62i intersect one another to form a pointed vertex portion (portion of intersection point). Thus, in the light exit plane 18a of the light guide plate 18, a dark point corresponding to the intersection point 62j (vertex portion) may be generated to be viewed. In this case, preferably, the generation of a dark line is prevented by rounding the intersection point 62j to make a vertex of a section round (R), or a dark line is made invisible or difficult to be viewed by suppressing the generation of a dark line. Further, two of the four inclined planes 62f, 62g, 62h and 62i intersect each other, and four pointed ridgelines are formed from end points of four intersection lines where two of the four light entrance planes 62b, 62c, 62d, and 62e intersect each other to the intersection point 62j. Thus, to prevent the generation of dark lines in the ridgeline portions, preferably, the ridgeline portions are similarly rounded.

The reflection sheet 64 is a reflection sheet of a quadrangular pyramid shape disposed to cover the inclined planes 62f, 62g, 62h, and 62i constituting the four planes of the light guide plate 62 of the quadrangular pyramid shape.

Accordingly, in the light guide plate 62 illustrated in FIG. 16, a light incoming from the light entrance plane 62a is scattered by the scattering particles contained in the light guide plate 62, passed through the light guide plate 62 directly or while being scattered, reflected on the inclined planes 62f, 62g, 62h and 62i, and emitted from the light exit plane 62a. In this case, a part of the light may leak from the inclined plane 62f, 62g, 62h or 62i. The leaked light is reflected on the reflection sheet 64 to enter the light guide plate 62 again.

The light guide plate 62 and the reflection sheet 64 are different from the light guide plate 18 and the reflection sheet 22 only in structure and shape. For functions and materials other than the structures and the shapes, similar components may be used.

Thus, the light guide plate 62 and the backlight unit 60 illustrated in FIG. 16 have functions similar to those of the light guide plate 18 and the backlight unit 2 illustrated in FIG. 1 and FIG. 2, and provide similar effects.

In each embodiment, the light guide plate is formed into the shape where the plane facing the light exit plane is inclined with respect to the light exit plane. However, the present invention is not limited to this. Any shape may be employed as long as a thickness of the light guide plate at the plane facing the light entrance plane is larger than that of the light guide plate at the light entrance plane. For example, the plane facing the light exit plane of the light guide plate may be curved. When the inclined plane is curved, a shape convex to the light exit plane side or a shape recessed to the light exit plane may be employed.

As another example of a light guide plate usable in the backlight unit of the present invention, a light guide plate is cited, which has a structure where the light guide plates 18, 52 and 62 illustrated in FIGS. 1, 15, and 16 are reversed, its light exit plane includes at least one flat inclined plane, and a plane opposite to the light exit plane includes a flat plane. The inclined plane of this light guide plate is inclined to the flat plane such that the light guide becomes thinner as becoming farther from a light entrance plane. In the light guide plate of this structure, a light incoming from the light entrance plane is emitted from the inclined plane.

In yet another example of a light guide plate usable in the present invention, both sides, i.e., a light exit plane and a backside of the light guide plate may include a plurality of inclined planes.

While the above-mentioned embodiments have been described with respect to a case where only one light guide plate is provided, the present invention is not limited thereto and one planar lighting device may include a plurality of light guide plates.

Figure 17:
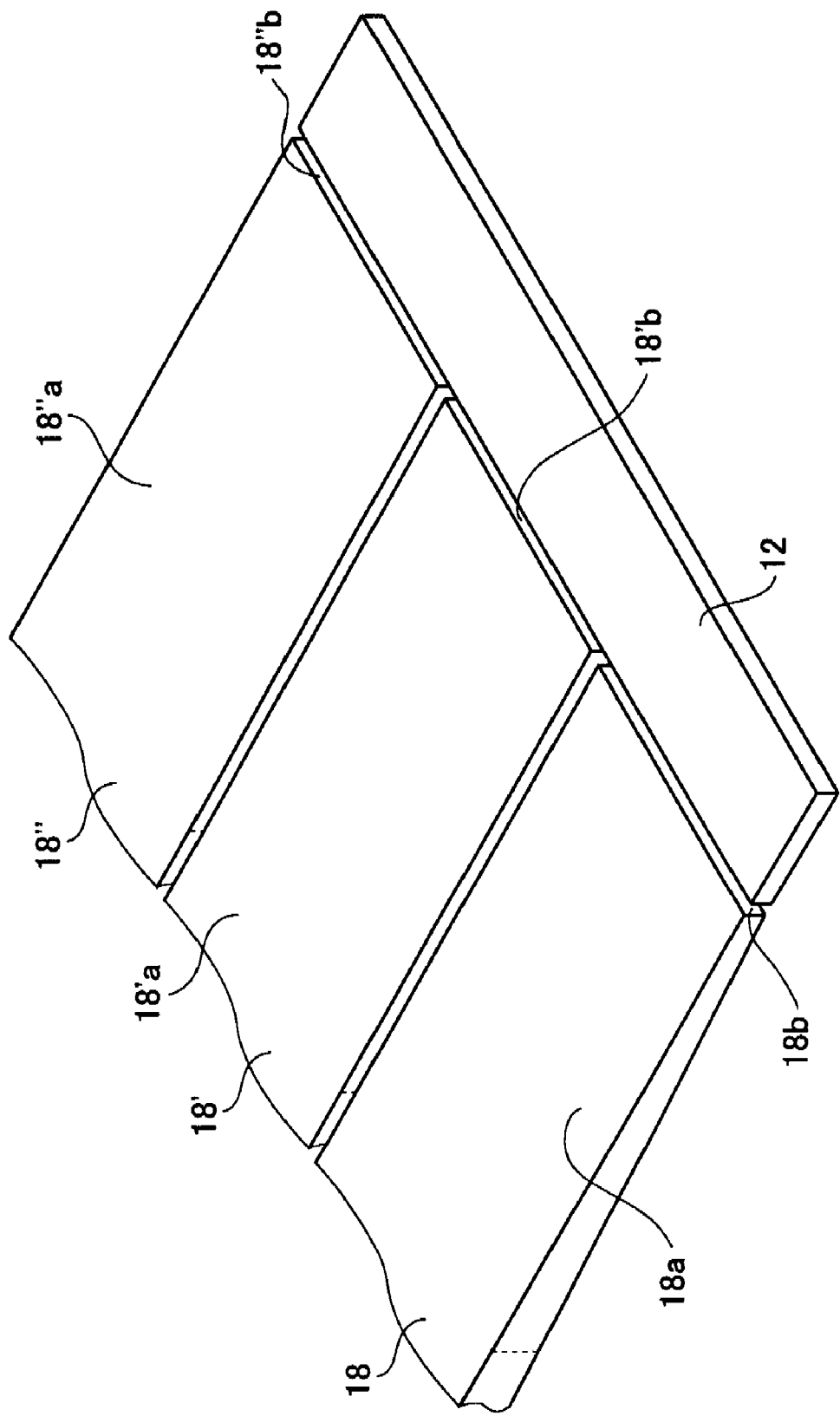
FIG. 17 is a schematic perspective view of a planar lighting device using a plurality of light guide plates according to an embodiment of the present invention.

FIG. 17 illustrates an example of a planar lighting device using a plurality of light guide plates. FIG. 17 only illustrates a light guide plate 18, a light guide plate 18', a light guide plate 18", and the light source 12*a* to clearly illustrate how the light guide plates are arranged.

The light guide plate which is the same as the light guide plate 18 illustrated in FIG. 1 can be used as each of the light guide plates 18, 18', and 18" illustrated in FIG. 17, and the plurality of the light guide plates are arranged such that the light exit planes of the individual light guide plates lie to form a single plane and that the light entrance planes thereof lie to form a single plane. Specifically, the light guide plate 18 and the adjacent light guide plate 18' are so positioned that the light exit plane 18*a* of the light guide plate 18 and a light exit plane 18*a*' of the adjacent light guide plate 18' form a single plane and that the light entrance plane 18*b* of the light guide plate 18 and a light exit plane 18'*b* of the adjacent light guide plate 18' form a single plane. The light guide plate 18 and the adjacent light guide plate 18' are preferably in close contact with each other. Likewise, the light guide plate 18' and the light guide plate 18" are so positioned that the light exit plane 18'*a* and a light exit plane 18"*a* of the respective light guide plates form a single plane and that the light entrance plane 18'*b* and the light entrance plane 18'*b* lie in the same plane.

For the light source 12*a*, except for a difference in length in an array arraying direction, the same one as the light source 12*a* illustrated in FIG. 1 can be used. The light source 12*a* is disposed at a position opposed to each of the light entrance planes of the light guide plates 18, 18', and 18". Accordingly, a light emitted from the common light source 12*a* enters the light entrance planes of the light guide plates 18, 18', and 18".

Thus, by arranging the plurality of light guide plates in parallel to form one light exit plane, a planar lighting device of a larger area can be provided. As a result, it can be used as a planar lighting device of a larger liquid crystal display device.

In FIG. 17, as in the case of the light source, one light exit plane formed by the plurality of light guide plates is preferably covered with one polarization separator film (not shown), one diffusion film (not shown), and one prism sheet (not shown) which are used in the present invention. Needless to say, in place of the polarization separator film and the diffusion film, a polarization separator layer may be formed on the light exit plane of the light guide plate, and a diffusion layer may be formed on the plane of the backside of the prism sheet.

In this embodiment, one rectangular plane of the light guide plate is set as the light exit plane. However, the light exit plane may be set as a first light exit plane, the backside opposite to the first light exit plane may be set as a second light exit plane, the two planes may be set as light exit planes, and light may be emitted from both planes. When this light guide plate is used, in addition to the first light exit plane side, on the second light exit plane side, a prism sheet, a diffusion film, and a polarization separator film are arranged in this order from the light exit plane side. In this case, in place of the polarization separator film and the diffusion film, a polarization separator layer and a diffusion layer may be used.

In the above-described embodiment, the light mixer is disposed between the light source and the light entrance plane of the light guide plate. However, the present invention is not limited to this. The light entrance plane of the light guide plate and the LED chip of the LED array of the light source may be brought close to each other and opposed to each other, and a part of the light entrance plane side of the light guide plate to which a light from the LED chip enters may be formed by a low refractive index member of a material different from another portion (base material) of the light guide plate.

Incorporating a low refractive index member having a lower refractive index than that of the base material in a part including the light entrance plane and admitting light emitted by the light source into the low refractive index member enables reduction of Fresnel loss of light emitted by the light source and admitted through the light entrance plane, which increases the light admission efficiency.

Further, the low refractive index member has a function of collimating and mixing incoming light, i.e., a function performed by the coupling lens and the mixer. The backlight unit using such a light guide plate, provided with the low refractive index member, allows light emitted by the light source to reach a farther position without the coupling lens and the mixer and is capable of emitting uniform illumination light free from brightness unevenness.

The light exit plane of the light guide plate is preferably formed of a low refractive index member substantially in its entirety. When substantially the entire surface of the light exit plane is formed of a low refractive index member, light emitted by the light source and entering the light guide plate can be admitted into the low refractive index member, which further improves the light admission efficiency.

There is no particular limitation on a shape of the low refractive index member. For example, various shapes such as a convex half-cylindrical shape, a prismatic shape where a sectional shape is square, a truncated pyramid shape, and a shape where a sectional shape is semicircular, hyperbolic, or parabolic can be employed with respect to the plane opposite to the light entrance plane of the light guide plate, in other words, the inside of the light guide plate.

The low refractive index member having the shape as described above can also improve the light admission efficiency.

Next, referring to FIGS. 18 to 24, the light guide plate of the third aspect of the present invention, the planar lighting device using the same of the fourth aspect of the present invention, and the liquid crystal display device including the planar lighting device according to the fifth aspect of the present invention are described.

Figure 18:
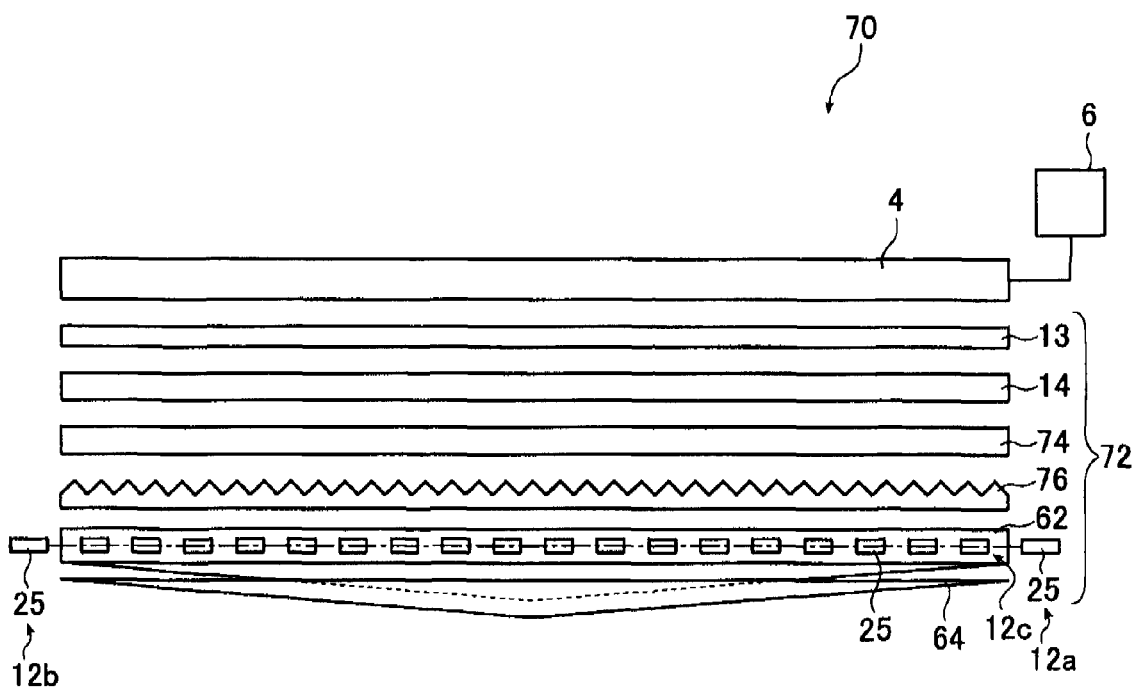
FIG. 18 is a schematic sectional view of a liquid crystal display device which includes the planar lighting device according to the present invention.
Figure 19:
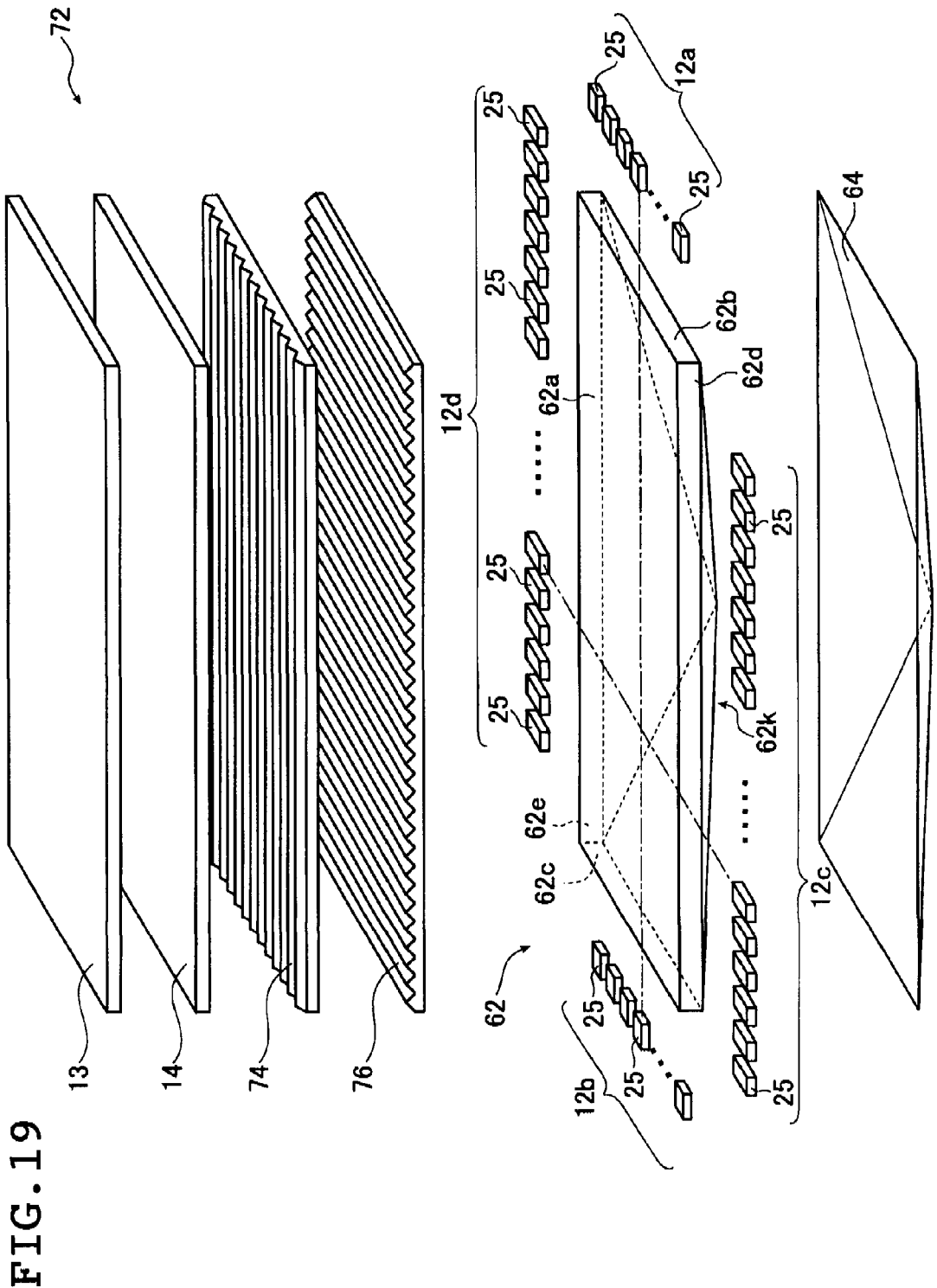
FIG. 19 is an exploded perspective view of the planar lighting device according to the present invention.

FIG. 18 is an exploded side view schematically illustrating the liquid crystal display device which includes the planar lighting device of the present invention. FIG. 19 is an exploded perspective view of a schematic structure of the planar lighting device (backlight unit) of the present invention.

A liquid crystal display device 70 illustrated in FIGS. 18 and 19 is different from the liquid crystal display device 10 illustrated in FIGS. 1A and 1B in configuration of the backlight unit. A backlight unit 72 of the liquid crystal display device 70 illustrated in FIGS. 18 and 19 has a configuration similar to that of the backlight unit 2 of the liquid crystal display device 10 illustrated in FIGS. 1A and 1B except for differences in shapes of a light guide plate and a reflection sheet and configuration of a prism sheet, and disposition of light sources and light mixers in four side ends (four sides) of a rectangular light exit plane. Thus, similar components are denoted by similar reference symbols, and detailed description thereof is omitted. Identical components are denoted by identical reference symbols, and description thereof is omitted.

As illustrated in FIGS. 18 and 19, the liquid crystal display device 70 basically includes the backlight unit 72, a liquid crystal display panel 4 disposed on a light exit plane side of the backlight unit 72, and a drive unit 6 (coupled portion with the backlight unit 72 is not shown) for driving these.

As illustrated in FIGS. 18 and 19, the backlight unit 72 of the present invention includes light sources 12a to 12d, a polarization separator film 13, a diffusion film 14, two prism sheets 74 and 76, a light guide plate 62, and a reflection sheet 64. These optical components constituting the backlight unit 2 are described below.

First, the light sources 12a, 12b, 12c and 12d are described. Needless to say, the same ones as those of the light sources 12a, 12b, 12c, and 12d used in the backlight units 2 and 60 illustrated in FIGS. 1A and 1B and FIG. 16 can be used.

As illustrated in FIGS. 18 and 19, the four light sources 12a to 12d are arranged respectively on four lateral planes serving as light entrance planes of the light guide plate 62 in a manner of facing thereto. Each light source 12 includes a plurality of LED chips (may simply be referred to as white LEDs hereinafter) 25. The white LEDs 25 are arranged to face four light entrance planes (lateral planes) 62b, 62c, 62d and 62e of the light guide plate 62. The plurality of white LEDs 25 of each light source 12 are arranged at fixed intervals to surround the four light entrance planes (lateral planes) 62b to 62e of the light guide plate 62. Light emitted from the light sources 12a to 12d enters the light guide plate 62 through the four light entrance planes 62b to 62e.

Each white LED 25 disposed to face each light entrance plane of the light guide plate 62 may be arranged coaxially with or shifted from the white LED 25 disposed to face the light entrance plane of a side opposite to the light entrance plane via the light guide plate 62.

In the present invention, preferably, by arranging the plurality of LEDs (LDs) constituting the light sources 12a to 12d at high density to a certain extent, each light source 12 is configured to function as a thin planar light source (linear light source) in a pseudo manner. It is important in this case that an emission density of light incoming to the four light entrance planes (lateral planes) 62b to 62e of the light guide plate 62 is denoted by $S_L$[lm/mm²] and, in the present invention, this emission density $S_L$ is preferably set to 2.0 [lm/mm²] or higher. The emission density $S_L$ necessary for light entered to the four light entrance planes of the light guide plate can be represented by the following Expression (11) as in the case of the emission density $S_L$ necessary for light entered to the two light entrance planes of the light guide plate used by the second aspect of the present invention, where a necessary illuminance of a light emitted from the light exit plane of the light guide plate is denoted by E[lx], a longitudinal length of the light guide plate is denoted by $L_a$[m], a length in a direction perpendicular to the longitudinal direction is denoted by $L_b$[m], a thickness of the light guide plate is denoted by t[m], and light use efficiency of the light guide plate is denoted by p.

[Equation 6]

$$S_L = \frac{E \cdot L_a \cdot L_b}{p \cdot 2(L_a + L_b) \cdot t} \quad (11)$$

According to this embodiment of this aspect, by using the light source where the emission density $S_L$ satisfies the above-mentioned expression and a real size of an emission area is less than a thickness of the light guide plate, a planar lighting device higher in brightness, thinner and larger than the conventional device can be realized.

The illustrated example employs the configuration where the plurality of LED chips (white LEDs) 25 are arranged at fixed intervals to constitute the light source 12. However, this aspect is not limited to this. As in the case of the above-mentioned embodiment, in place of the light source 12, the light source 15 that includes an LED array 29 including a plurality of RGB-LEDs 30 and coupling lenses 40 disposed on the respective LEDs of the LED array 29 illustrated in FIG. 12 can be used. As illustrated in FIGS. 12 and 13, the light source 15 is configured by regularly arranging a plurality of sets of R-LEDs 32, G-LEDs 34, and B-LEDs 36 constituting the respective RGB-LEDs 30, and attaching ball lenses 42, 44, and 46 to light exit sides of the LEDs 32, 34, and 36.

According to this embodiment, the light source 15 of such a structure can be disposed to face each of the light entrance planes 62b to 62e of the light guide plate 62.

Figure 20A:
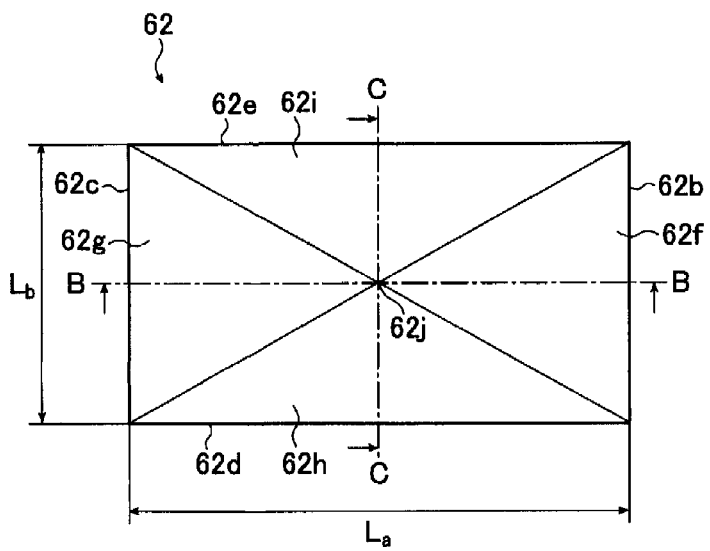
FIG. 20A is a back view of a light guide plate of the present invention.
Figure 20C:
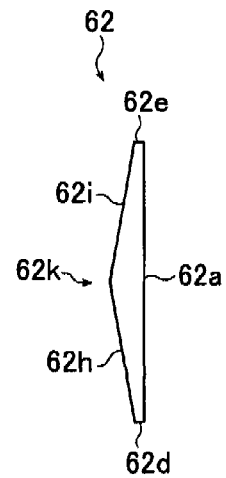
FIG. 20C is a view cut along a line C-C of the light guide plate illustrated in FIG. 20A.
Figure 20B:
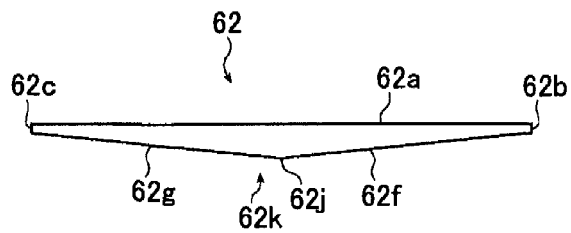
FIG. 20B is a view cut along a line B-B of the light guide plate illustrated in FIG. 20A.

Next, referring to FIGS. 19 and 20A to 20C, the light guide plate 62 of the backlight unit 72 is described. FIG. 20A is a schematic back view of the light guide plate 62 of the present invention, FIG. 20B is a view taken along the line B-B of the light guide plate illustrated in FIG. 20A, and FIG. 20C is a view taken along the line C-C.

As illustrated in FIGS. 19 and 20A to 20C, the light guide plate 62 includes a substantially rectangular flat light exit plane 62a, a quadrangular pyramid backside 62k, and four rectangular lateral planes perpendicular to the light exit plane 62a. In the light guide plate 62 of the present invention, the four lateral planes serve as the light entrance planes 62b, 62c, 62d and 62e, and light emitted from the light sources 12a to 12d is entered from the four light entrance planes 62b to 62e. The light entrance planes 62b to 62e of the light guide plate 62 are formed flat and, as described above, the light sources 12a to 12d are arranged to face the light entrance planes 62b to 62e.

In the illustrated example, the light entrance planes (lateral planes) 62b to 62e of the light guide plate 62 are formed flat. However, the light entrance planes may be formed convex or concave. The light entrance planes 62b to 62e of the light guide plate 62 may be formed to incline with respect to the light exit plane 62a. In this case, the disposition of the light sources can be adjusted so that light emitted from the light sources can enter perpendicularly to the lateral planes.

The light guide plate 62 is thickest in the center, gradually reduced in thickness from the center to the four light entrance planes (lateral planes) 62b to 62e, and thinnest in the end of the light guide plate 62.

There is no particular limitation on a thickness of the light guide plate 62. However, for a reason that, if the center is excessively thickest, the entire light guide plate is made thicker, a ratio of a maximum thickness to a minimum thickness is preferably less than 4.

Especially, the ratio of a maximum thickness to a minimum thickness is preferably 1.5 to 2.5, and most preferably about 2. The reason therefor is that a thickness of a line light source using a currently used LED is about 1 to 2 mm at the minimum, and the flat light guide plate used in the conventional art is about 5 to 8 mm. For the present invention, as compared with the conventional art, realizing thinning while maximizing light use efficiency is a preferable condition, and thus a condition that allows setting of a maximum thickness of the light guide plate to about 2 to 4 mm is preferable.

The backside 62k of the light guide plate 62 has a quadrangular pyramid shape where a center is a vertex, and includes four flat triangular inclined planes 62f, 62g, 62h, and 62i. The inclined planes 62f to 62i incline at predetermined angles to the light exit plane 62a. In the illustrated example, the inclined planes 62f to 62i are formed flat. However, the present invention is not limited to this. The inclined planes 62f to 62i may be formed into convex or concave curves.

A center potion of the backside 62k of the light guide plate 62 may be formed flat in parallel to the light exit plane 62a, or curved. By forming flat in parallel to the light exit plane 62a or curving the center portion of the backside 62k of the light guide plate 62, the occurrence of a dark portion in the center portion of the light exit plane 62a can be reduced, and an illumination light where brightness unevenness is reduced more can be obtained.

In the backside 62k of the light guide plate 62, all or a part of coupled portions of the adjacent inclined planes may be curved. In this way, by curving the coupled portions of the adjacent inclined planes of the backside 62k of the light guide plate 62, the occurrence of dark lines in portions of the light exit plane 62a corresponding to the coupled portions of the inclined planes can be reduced, and an illumination light where brightness unevenness is reduced more can be obtained.

Further, in the present invention, a plurality of prism arrays can be formed on the inclined planes 62f to 62i constituting the backside 62k of the light guide plate 62. Instead of the prism arrays, optical elements similar to prisms may be formed regularly. For example, optical elements having lens effects such as lenticular lenses, concave lenses, convex lenses, or optical elements in pyramidal shape may be formed on the inclined planes of the backside of the light guide plate.

In the light guide plate 62 illustrated in FIGS. 19 and 20A to 20C, light incoming from the four lateral planes 62b to 62e is emitted from the light exit plane 62a while being scattered by scattering particles (described below in detail). In this case, a part of the light passing in the light guide plate 62 may leak from the backside 62k. The leaked light is reflected on the reflection sheet 64 disposed to cover the backside of the light guide plate 62, and enters the light guide plate 62 again.

As in the case of the light guide plate 18, the light guide plate 62 is formed by kneading and dispersing scattering particles for scattering a light in a transparent resin. The light guide plate 62 is manufactured, as in the case of the light guide plate 18, for example, by injection molding or press molding. In the case of the press molding, an extrusion molded section is not uniform. Thus, the light guide plate 62 is preferred to be manufactured by the injection molding.

In this embodiment, at least one of a size of the light guide plate, the number of scattering particles contained therein, and its particle size is preferably adjusted to satisfy the following Expressions (1), (2) and (8), where $L_a$ denotes a longitudinal length of the light guide plate 62, $L_b$ denotes a length in a direction perpendicular (shorter direction) to the longitudinal direction, $\Phi$ denotes a scattering cross section of the scattering particles contained in the light guide plate 62, $L_G$ denotes a length half ($L_a/2$ in this embodiment) of the longer one of distances in a light entrance direction between the two opposing light entrance planes (62b and 62c), $N_P$ denotes a density of the scattering particles (number of particles per unit volume) contained in the light guide plate 62, and $K_C$ denotes a compensation coefficient:

$$1.1 \leq \Phi N_P L_G K_C \leq 8.2 \quad (1)$$

$$0.005 \leq K_C \leq 0.1 \quad (2)$$

$$1 \leq L_a/L_b \leq 2 \quad (8)$$

According to this aspect, by configuring the light guide plate in the manner of satisfying Expressions (1), (2) and (8), light use efficiency can be increased, and in-plane uniformity of brightness can simultaneously be realized. The reason for this is described below. Expressions (1) and (2) have been described in the first aspect of the present invention, and thus detailed description thereof is omitted. Differences are mainly described.

To increase the light use efficiency of the light guide plate 62, a light loss caused by passing of a light entered from the light entrance plane 62b (62d) of the lateral plane through the light entrance plane 62c (62e) of the opposite lateral plane only needs to be suppressed to a minimum, and most of the incoming light only needs to be emitted from the light exit plane 62a. As described above, a scattering effect in the light guide plate 62 is associated with a scattering cross section (scattering energy per unit time) determined from particle diameters of the scattering particles contained in the light guide plate 62, a refractive index of the scattering particles, a particle size distribution of the scattering particles, and a refractive index of a material as a base material of the light guide plate 62 by Mie theory, a particle density of the scattering particles, and a light guiding distance from the entrance.

In the backlight unit of the present invention, as illustrated in FIGS. 19 and 20A to 20C, light is entered from the light entrance planes 62b to 62e of the four lateral planes of the light guide plate 62. In this case, if the light exit plane 62a of the light guide plate 62 is not square but rectangular, when light is entered from the light entrance planes 62b to 62e of the four lateral planes of the light guide plate 62, light guide lengths (optical path lengths) in which the light entered from the light entrance planes 62d and 62e of the lateral planes parallel to a longitudinal direction is emitted from a substantial center of the light exit plane 62a are different from those in which the light entered from the light entrance planes 62b and 62c of the lateral planes perpendicular to the longitudinal direction is emitted from the substantial center of the light exit plane 62a. Thus, when a longitudinal length in the light guide plate 62 is denoted by $L_a$[m] and a length of the direction perpendicular to the longitudinal direction (shorter direction) is denoted by $L_b$[m], if a ratio ($L_a/L_b$) of these is excessively large, the following problems occur.

First, if, to emit most of the incoming light entered from the light entrance planes 62d and 62e of the two lateral planes parallel to the longitudinal direction of the light guide plate 62 from the light exit plane 62a, a particle density and a scattering cross section of the scattering particles contained in the light guide plate 62 are adjusted based on the above-described Expression (1) in which the $L_b$ substituted for the $L_G$, there is a fear that most of light entered from the light entrance planes 62b and 62c of the two lateral planes perpendicular to the longitudinal direction may be scattered before reaching the substantial center of the light guide plate 62, causing a reduction of light reaching the center of the light guide plate 62 to generate brightness unevenness.

If, to emit most of incoming light entered from the light entrance planes 62b and 62c of the two lateral planes perpendicular to the longitudinal direction of the light guide plate 62 from the light exit plane 62a, a particle density and a scattering cross section of the scattering particles contained in the light guide plate 62 are adjusted based on the above-described Expressions (1) and (2) in which the $L_a$ is substituted for the $L_G$, there is a fear that a ratio of light passed through the center of the light guide plate 62 to exit from the light entrance planes of the opposite lateral planes to the light entered from the light entrance planes 62d and 62e of the two lateral planes parallel to the longitudinal direction may increase to reduce light use efficiency.

Thus, according to the present invention, the light guide plate is configured so as to satisfy Expressions (1), (2), and (8), in other words, so that a value of $\Phi \cdot N_P \cdot L_G \cdot K_C$ can be 1.1 or higher and 8.2 or lower, and a ratio $L_a/L_b$ of a longitudinal length $L_a$ of the light guide plate to a length $L_b$ in a direction perpendicular to the longitudinal direction can be 1 or higher and 2 or lower. In this way, light use efficiency of the light guide plate can be increased, and an illumination light of high in-plane uniformity of brightness can be obtained.

The reason why the scattering-particle-dispersed light guide plate used by the present invention are designed to satisfy the relational Expressions (1), (2), and (8) has been described.

In the conventional flat light guide plate, when scattering particles are mixed based on the above-mentioned expression to maximize light use efficiency, brightness unevenness appears in the light exit plane. This occurs because the presence of the scattering particles causes emission of much incoming light from the light exit plane near the lateral plane which is an incoming light plane (light entrance plane). Thus, in the light guide plate of the present invention, the backside opposite to the light exit plane is formed into a quadrangular pyramid shape, and the backside is inclined with respect to the light exit plane so that the center of the light guide plate can be thick. In this way, among rays entered from the light entrance planes of the lateral planes of the light guide plate, the amounts of rays fully reflected on the inclined backside are increased, thereby increasing rays directed to the center of the light guide plate. Inclining the backside of the light guide plate suppresses leakage of the light entered into the light guide plate to the outside of the light guide plate from the light exit plane or the backside near the light entrance plane of the lateral plane for entering light. Thus, the incoming light can be guided to the vicinity of the center of the light guide plate. The rays entered from the light entrance planes of the lateral planes of the light guide plate and passed through the center are reflected on the inclined backside to be easily emitted from the light exit plane. As a result, emission efficiency can be increased.

The conventional light guide plate of the sidelight type is formed into a flat plate or wedge shape (thickness of the light guide plate becomes gradually smaller as a light guiding distance becomes longer), the light sources are arranged on the light entrance plane of one lateral plane of the light guide plate or on the light entrance planes of both opposing lateral planes, and light is entered from the light entrance plane of the one lateral plane or the light entrance planes of both lateral planes. On the other hand, the light guide plate of the present invention has a shape point-symmetrical at the center (quadrangular pyramid shape), enabling entry of light from all the four light entrance planes of the lateral planes. Thus, when an emission density of the used light source (LED) is equal to that of the conventional case, the amount of light greater by four times or twice than the conventional case can enter the light guide plate of the present invention. As a result, the light guide plate of the present invention can achieve high brightness as compared with the conventional light guide plate of the sidelight type.

When light sources are arranged at equal emission densities, since a thickness of the light guide plate can be reduced by ¼ or ½ while maintaining the same emission brightness as that of the conventional case, thinning greater than that of the conventional case can be achieved.

Moreover, when the light guide plate of the present invention is configured with a thickness equal to that of the conventional light guide plate, and when the backlight unit is configured by using light sources of emission densities equal to those of the conventional case, the same emission brightness as that of the conventional case can be maintained even when power supplied to the light sources is made smaller than that of the conventional case. Thus, by using the light guide plate of the present invention, when the number of light sources (LEDs) is increased, power can be saved in view of light use efficiency of the light guide plate higher than that of the conventional case if the light sources are driven by equal driving power. Accordingly, by reducing driving power of one LED, lower power consumption can be achieved. As a result, generally, power supplied to the light sources can be reduced to achieve low power consumption.

According to this embodiment, the light guide plate 62 can be manufactured by using the same transparent resin material as that of the light guide plate 18. Similarly, the light guide plate may be manufactured by mixing plasticizers in the transparent resin.

In the backlight unit 72 of this embodiment, as in the case of the backlight unit 60 illustrated in FIG. 16, the light mixers for mixing incoming light can be disposed in a manner of being bonded to the four lateral planes (light entrance planes) 62b to 62e of the light guide plate 62. The light mixers can be configured as columnar optical components where particles for scattering light are mixed in transparent resins, and have functions of mixing light emitted from the LEDs to enter light into the light guide plate.

This embodiment enables use of the same polarization separator film 13 and diffusion film 14 as those of the backlight units 2 and 60 described above. The polarization separator film 13 and the diffusion film 14 are configured as separate members. However, the polarization separator film 13 may be integrated with the diffusion film 14.

In the illustrated example, the polarization separator film 13 is disposed on the light exit side of the diffusion film 14. However, the present invention is not limited to this. The polarization separator film 13 may be disposed directly on the light exit plane 62a of the light guide plate 62.

Next, the prism sheets 74 and 76 are described.

As illustrated in FIGS. 18 and 19, two prism sheets are disposed between the light guide plate 62 and the diffusion film 14. Each of the prism sheets is an optical member formed by arraying a plurality of long and thin prisms in parallel on the surface of a transparent sheet, and can improve brightness by enhancing condensing of light emitted from the light exit plane of the light guide plate 62. The prism sheets 74 and 76 of the illustrated example are arranged so that extending directions of respective prism rows are perpendicular to each other. The prism sheets 74 and 76 are arranged so that vertex angles of the prisms do not face the light exit plane 62a of the light guide plate 62. There is no particular limitation on an arranging order of the two prism sheets 74 and 76.

In this embodiment, the two prism sheets 74 and 76 where the plurality of triangular prisms are arranged on the transparent resin sheets are used. In place of the two prism sheets 74 and 76, however, sheets that include regularly arranged optical elements similar to prisms may be used. Sheets which include regularly arranged elements having lens effects, for example, optical elements such as lenticular lenses, concave lenses, convex lenses or pyramid type elements, can be used in place of the prism sheets.

Figure 21:
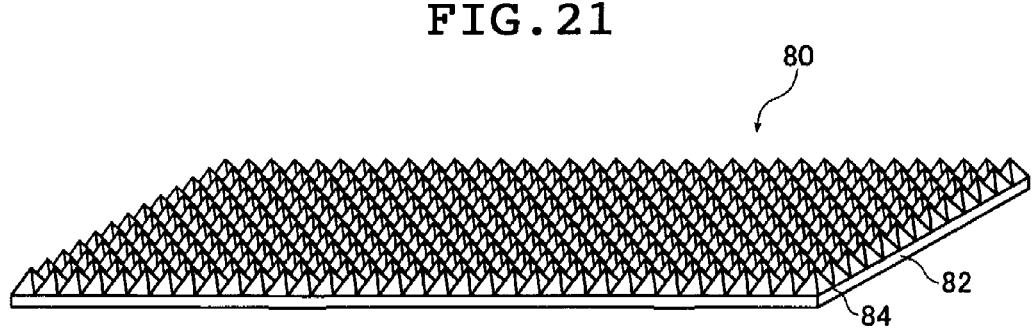
FIG. 21 is a schematic perspective view of a pyramid prism sheet.

In this embodiment, the backlight unit 72 is configured by using the two prism sheets 74 and 76. However, the backlight unit 72 may be configured by using only one of the prism sheets. In place of the two prism sheets 74 and 76, the backlight unit can be configured by using a pyramid type prism sheet 80 which includes many pyramid type prisms 84 regularly arranged on a surface of a transparent resin sheet 82 as illustrated in FIG. 21. By using such a pyramid type prism sheet 80, an optimal condensing effect can be obtained for an illumination light emitted from the light exit plane of the light guide plate of the present invention having four lateral planes from which light is entered, and the number of components of the backlight unit can be reduced.

Next, the reflection sheet 64 of the backlight unit 72 is described.

The reflection sheet 64 is disposed to reflect a light leaked from the backside 62*k* of the light guide plate 62, and to enter the light again to the light guide plate 62, whereby light use efficiency can be increased. The reflection sheet 64 is formed into a shape corresponding to the backside 62*k* of the light guide plate 62 to cover the inclined planes 62*f* to 62*i* constituting the backside 62*k*. In FIG. 18, the backside 62*k* of the light guide plate 62 is formed into the quadrangular pyramid shape, and hence the reflection sheet 64 is similarly formed into a quadrangular pyramid shape. As described above, when the inclined planes 62*f* to 62*i* of the backside 62*k* of the light guide plate 62 are curved, the reflection sheet 64 is similarly curved. When coupled portions of the inclined planes 62*f* to 62*i* of the backside 62*k* of the light guide plate 62 are curved, a portion of the reflection sheet 64 corresponding to the coupled portion of each inclined plane is curved. For the reflection sheet 64 illustrated in FIGS. 18 and 19, the same one as that for the reflection sheet 64 illustrated in FIG. 16 can be used.

Next, the diffusion film 14 is described.

As illustrated in FIGS. 18 and 19, the diffusion film 14 is disposed between the polarization separator film 13 and the prism sheet 74. For the diffusion film 14 illustrated in FIGS. 18 and 19, the same one as that for the diffusion film 14 illustrated in FIG. 16 can be used.

In FIGS. 18 and 19, the diffusion film 14 is disposed between the polarization separator film 13 and the prism sheet 74. However, there is no particular limitation on a disposing position of the diffusion film 14. The diffusion film 14 may be disposed between the light guide plate 62 and the prism sheet 76.

When the diffusion film 14 is disposed between the light guide plate 62 and the prism sheet 76, the diffusion film 14 may be disposed a given distance apart from the light exit plane of the light guide plate 62 to avoid adhering thereto. The distance may be altered as appropriate according to the light amount distribution of light emitted from the light exit plane of the light guide plate 62.

With the diffusion film 14 spaced apart a given distance from the light exit plane of the light guide plate 62, the light emitted from the light exit plane of the light guide plate 62 is subjected to further mixing (mixture) between the light exit plane and the diffusion film 14. This further enhances the uniformity of brightness of the light passing through the diffusion film 14 to illuminate the liquid crystal display panel 4.

The diffusion film 14 may be spaced a given distance apart from the light exit plane of the light guide plate 62 by, for example, providing a spacer between the diffusion film 14 and the light guide plate 62.

Figure 22:
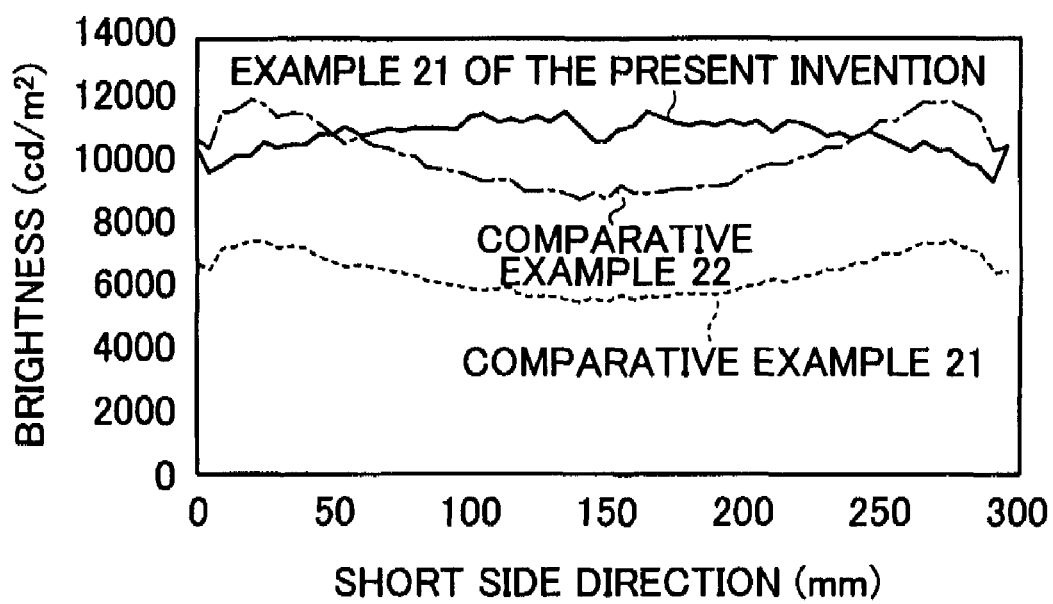
FIG. 22 is a graph illustrating a simulation result of a brightness distribution of an illumination light of the planar lighting device according to the present invention.

A brightness distribution of an illumination light of the backlight unit which has a structure illustrated in FIGS. 18 and 19 was obtained by simulation. Its result is illustrated as Example 21 of the present invention in FIG. 22. FIG. 22 illustrates, for the purpose of comparison with Example 21 of the present invention, a result of simulation of a brightness distribution of an illumination light of a backlight unit (Comparative Example 21) which has a structure similar to that of the backlight unit of FIG. 18 except for use of a flat light guide plate and arrangement of light sources on two opposing lateral planes of the light guide plate, and a result of simulation of a brightness distribution of an illumination light of a backlight unit (Comparative Example 22) which has a structure similar to that of the backlight unit of FIG. 18 except for use of a flat light guide plate. In FIG. 22, the horizontal axis indicates a distance from one end to the other end of the backlight unit in a shorter direction, and the vertical axis indicates brightness of the light exit plane of the backlight unit.

A graph of FIG. 22 illustrates a simulation result when a light guide plate of a 22-inch size (about 56 cm) is used. It is obvious from the graph of FIG. 22 that the backlight unit of Example 21 of the present invention can achieve brightness about twice as large as that of the backlight unit of the type of Comparative Example 21 which enters light from the two lateral planes of the light guide plate. The backlight unit of Example 21 of the present invention has brightness unevenness suppressed more as compared with the backlight unit of Comparative Example 22 which enters light from the four lateral planes by using the flat light guide plate.

Figure 23:
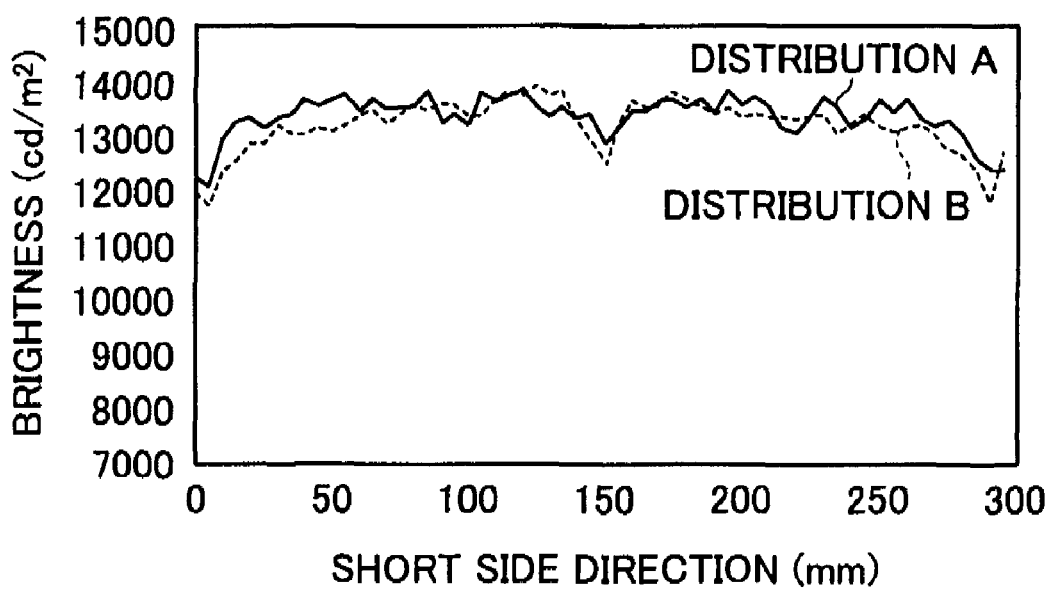
FIG. 23 is a graph illustrating a simulation result of a brightness distribution of an illumination light emitted from a light exit plane of a backlight unit when a top portion of a backside of the light guide plate is formed by a curved plane.

A brightness distribution of an illumination light when the vertex portion of the backside 62*k* of the light guide plate 62 of the backlight unit 72 illustrated in FIGS. 18 and 19 is curved was obtained by simulation. Its result is indicated by a distribution A of FIG. 23. In a graph of FIG. 23, as in the graph of FIG. 22, the horizontal axis indicates a distance from one end to the other end of the backlight unit in a shorter side direction, and the vertical axis indicates brightness of the light exit plane of the backlight unit. FIG. 23 additionally illustrates a brightness distribution (distribution B) of an illumination light of the backlight unit of the present invention where the vertex portion of the backside of the light guide plate is not curved. It is obvious from this graph that, by curving the vertex portion of the backside of the light guide plate of the shape illustrated in FIGS. 18 and 19, brightness unevenness in the center of the light exit plane of the backlight unit can be reduced.

Figure 24:
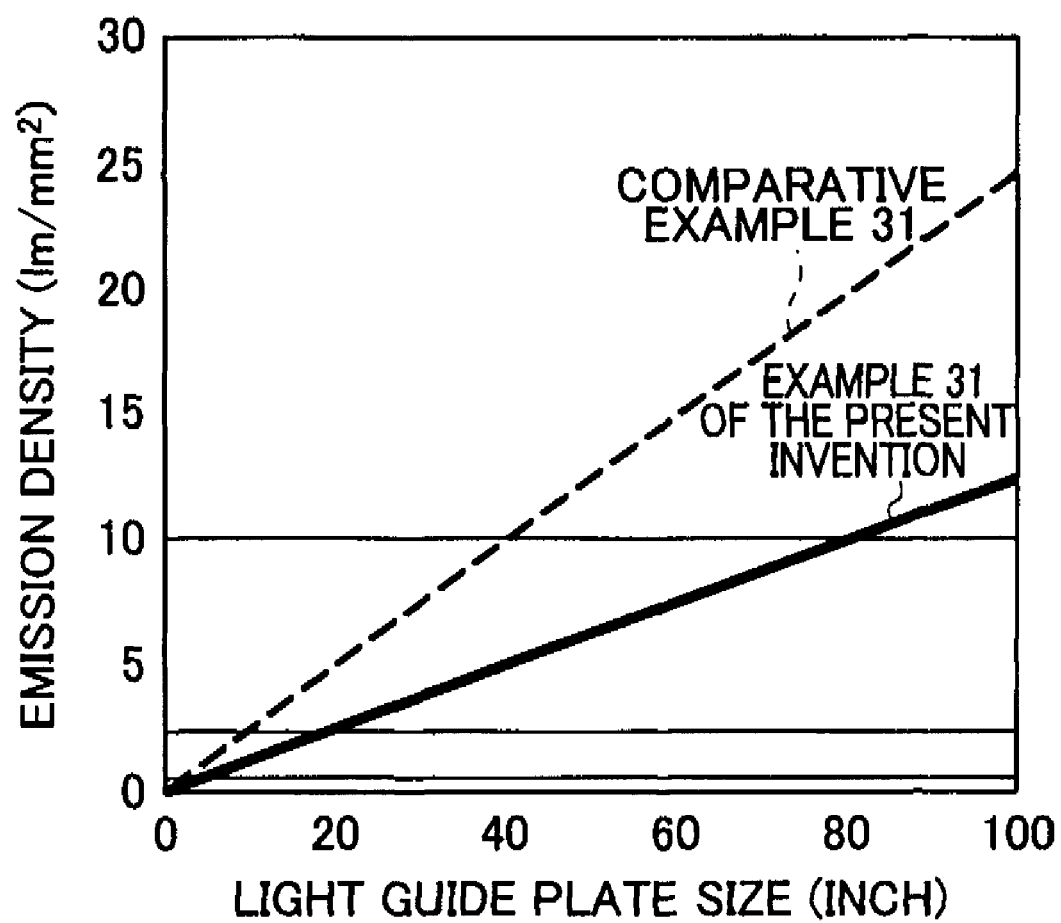
FIG. 24 is a graph illustrating a relationship between a size of the light exit plane of the light guide plate according to the present invention and an emission density necessary for causing a light to enter through a lateral plane of the light guide plate to obtain a target illuminance.

FIG. 24 is a graph illustrating, as Example 31 of the present invention, a relationship between a size of the light exit plane of the light guide plate of the present invention and an emission density necessary for entering a light from the lateral plane of the light guide plate to obtain a target illuminance when a backlight unit is configured by using this light guide plate. For the purpose of comparison, FIG. 24 additionally illustrates a graph for a backlight unit (Comparative Example 31) which uses a flat light guide plate and enters light from two opposing lateral planes of the light guide plate. The emission density is calculated by the above-mentioned expression under conditions that a ratio $L_a/L_b$ of a longitudinal length La of the light guide plate to a length $L_b$ in a direction perpendicular to the longitudinal direction is 1.78, light use efficiency p of the light guide plate is 0.8, a target illuminance E is 25,000 [lx], and a thickness t of the light guide plate is 1.0 [mm].

As obvious from FIG. 24, when an LED (general-purpose chip LED of about 1.0 [lm]) with an emission density of 0.5 [lm/mm$^2$] is used as a light source, a maximum size of the backlight unit of Example 31 of the present invention is 4 inches (about 10 centimeters) while a maximum size of the backlight unit of Comparative Example 31 is 2 inches (about 5 centimeters). When an LED (high brightness type chip LED of about 5.0 [lm]) with an emission density of 2.5 [lm/mm$^2$] is used as a light source, a maximum size of the backlight unit of Example 31 of the present invention is 20 inches (about 50 centimeters) while a maximum size of the backlight unit of Comparative Example 31 is 10 inches (about 25 centimeters). Thus, even when light sources of equal emission densities are used, according to the present invention, a backlight unit of a lighting area lager than the conventional case can be realized.

Moreover, by using an LED (ultrahigh brightness type chip LED of about 20.0 [lm]) with an emission density of 10.0 [lm/mm$^2$] as a light source, a lightweight ultra large backlight unit having suppressed brightness unevenness and a maximum size of 80 inches (about 203 centimeters) can be realized.

The backlight unit of the present invention and the components thereof have been described in detail. In the present invention, there is no particular limitation on an arranging order of the optical components disposed on the light exit plane side of the light guide plate of the backlight unit. For example, a backlight unit may be configured by arranging one prism sheet, a diffusion film, and a polarization separator film on the light exit plane of the light guide plate in this order, arranging a diffusion film, two prism sheets, and a polarization separator film on the light exit plane of the light guide plate in this order, or arranging the pyramid type prism sheet, a diffusion film, and a polarization separator film on the light exit plane of the light guide plate in this order. As described above, when a polarization separator film is integrally formed on the light exit plane of the light guide plate, a backlight unit can be configured by arranging two prism sheets or one pyramid type prism sheet on the polarization separator film.

The light guide plate, light guide plate assembly, planar lighting device, and liquid crystal display device of the present invention have been described in detail by way of various embodiments and examples. However, the present invention is not limited to the embodiments and the examples. Needless to say, various modifications and changes can be made without departing from the spirit and scope of the present invention.

For example, the planar lighting device of the present invention can be used as a planar lighting device for lighting outdoors/indoors, or a backlight for an advertisement panel, an advertisement tower, or a billboard.

INDUSTRIAL APPLICABILITY

The light guide plate of the present invention can emit a uniform planar illumination light of a large lighting area. The light guide plate can accordingly be used as a light guide plate for a planar lighting device for lighting outdoors/indoors, or a planar lighting device used as a backlight for a liquid crystal display panel of a liquid crystal display device, an advertisement panel, an advertisement tower or a billboard.

The light guide plate assembly of the present invention can maximize light use efficiency and front brightness. The light guide plate assembly can accordingly be used as a light guide plate assembly for a planar lighting device for lighting outdoors/indoors, or a planar lighting device used as a backlight for a liquid crystal display panel of a liquid crystal display device, an advertisement panel, an advertisement tower or a billboard.

The planar lighting device of the present invention can be used as a planar lighting device for lighting outdoors/indoors, or a planar lighting device used as a backlight for a thin, lightweight and large-screen liquid crystal display panel of a liquid crystal display device, an advertisement panel, an advertisement tower or a billboard.

The liquid crystal display device of the present invention can be used as a thin, lightweight and large-screen liquid crystal display device.

The invention claimed is:

1. A light guide plate assembly, comprising:
a light guide plate which includes a light exit plane for emitting a planar light and a light entrance end disposed in one end of the light exit plane and substantially orthogonal to the light exit plane, is formed into a shape having a thickness in a direction orthogonal to the light exit plane, the thickness being gradually larger as being farther from the light entrance end, and contains scattering particles dispersed therein; and
a prism sheet which includes a plurality of prisms arrayed in parallel with each other, and is arranged so that vertex angles of the plurality of prisms face the light exit plane of the light guide plate, wherein:
the scattering particles scatter light entering from the light entrance end and propagating in the light guide plate, which satisfy Expressions (1) and (2) below;
when lengths of two straight lines sandwiching each of the vertex angles of the plurality of prisms of the prism sheet are equal to each other, an angle formed between the two straight lines of the equal lengths satisfies Expression (3) below; and
when the lengths of the two straight lines sandwiching the each of the vertex angles of the plurality of prisms are different from each other, an angle formed between the straight lines of the different lengths satisfies Expression (4) below, $$1.1 \leq \Phi N_p L_G K_C \leq 8.2 \tag{1}$$

$$0.005 \leq K_c \leq 0.1 \tag{2}$$

$$55° \leq \theta \leq 80° \tag{3}$$

$$0° \leq \theta_1 \leq 15° \text{ and } 30° \leq \theta_2 \leq 45° \tag{4}$$

in Expressions (1) and (2), $\Phi$ represents a scattering cross section [m$^2$] of the scattering particles, $N_p$ represents a density [pieces/m$^3$] of the scattering particles, $L_G$[m] represents a length extending from the light entrance end to a thickest part of the light guide plate in an entrance direction, and Kc represents a compensation coefficient, in Expression (3), $\theta$ represents the angle formed between the two straight lines of the equal lengths, and in Expression (4), $\theta_1$ represents an angle formed between a perpendicular from a vertex of each of the vertex angles of the plurality of prisms with respect to a bottom of each of the plurality of prisms and one of the straight lines of the different lengths, and $\theta_2$ represents an angle formed between the perpendicular and another of the straight lines of the different lengths.

2. The light guide plate assembly according to claim 1, wherein:
the light exit plane of the light guide plate is rectangular;
the light entrance end comprises two light entrance planes substantially orthogonal to the light exit plane in two opposing sides of the rectangular light exit plane; and
the light guide plate is formed into a shape having a maximum thickness on a center line of the two opposing sides of the rectangular light exit plane.

3. The light guide plate assembly according to claim 1, wherein:
the light exit plane of the light guide plate is rectangular;
the light entrance end comprises four light entrance planes substantially orthogonal to the light exit plane in four opposing sides of the rectangular light exit plane; and
the light guide plate is formed into a pyramidal shape having a maximum thickness on a center of the four opposing sides of the rectangular light exit plane.

4. The light guide plate assembly according to claim 1, wherein the vertex angles of the plurality of prisms of the prism sheet are determined according to a concentration of the scattering particles contained in the light guide plate.

5. The light guide plate assembly according to claim 1, further comprising one of a diffusion film and a diffusion layer disposed in a plane side of the prism sheet, the plane side being opposed to the light exit plane, wherein:
in the one of the diffusion film and the diffusion layer, as diffusion conditions, when a ray having intensity $P_0$ passes through the one of the diffusion film and the diffusion layer transmitted diffused light is represented by Expression (5) below; and
an orientation evaluation parameter S represented by Expression (6) below satisfies Expression (7) below, when an intensity distribution of outgoing light from the light guide plate and the one of the diffusion film and the diffusion layer is represented by $L(\Phi)[cd/m^2]$, $$P(\phi) = P_0 \exp\left[-\frac{1}{2} \cdot \left(\frac{\phi}{\sigma}\right)^2\right] \quad (5)$$

$$S(\sigma) = \int_0^{\pi/2} \left|\frac{d^2(L(\phi, \sigma))}{d\phi^2}\right| d\phi \quad (6)$$

$$0 \leq S \leq 20 \quad (7)$$

in Expressions (5) and (6), $\Phi$ represents one of a diffusion angle and an emission angle, $\sigma$ represents a diffusion angle standard deviation, and $d^2/d\Phi^2$ represents second derivative.

6. The light guide plate assembly according to claim 5, wherein the diffusion film is disposed on a plane of the prism sheet.

7. The light guide plate assembly according to claim 5, wherein the diffusion layer is integrally provided on a plane of the prism sheet.

8. The light guide plate assembly according to claim 5, further comprising a polarization separator film disposed on a plane side of the one of the diffusion film and the diffusion layer, the plane side being opposed to the prism sheet.

9. The light guide plate assembly according to claim 1, further comprising a polarization separator layer integrally provided on the light exit plane of the light guide plate.

10. A planar lighting device, comprising:
a light guide plate assembly; and
light sources linearly arranged to face the light entrance end of the light guide plate of the light guide plate assembly,
wherein said light guide plate assembly comprises:
a light guide plate which includes a light exit plane for emitting a planar light and a light entrance end disposed in one end of the light exit plane and substantially orthogonal to the light exit plane, is formed into a shape having a thickness in a direction orthogonal to the light exit plane, the thickness being gradually larger as being farther from the light entrance end, and contains scattering particles dispersed therein; and
a prism sheet which includes a plurality of prisms arrayed in parallel with each other, and is arranged so that vertex angles of the plurality of prisms face the light exit plane of the light guide plate, wherein:
the scattering particles scatter light entering from the light entrance end and propagating in the light guide plate, which satisfy Expressions (1) and (2) below;
when lengths of two straight lines sandwiching each of the vertex angles of the plurality of prisms of the prism sheet are equal to each other, an angle formed between the two straight lines of the equal lengths satisfies Expression (3) below; and
when the lengths of the two straight lines sandwiching the each of the vertex angles of the plurality of prisms are different from each other, an angle formed between the straight lines of the different lengths satisfies Expression (4) below, $$1.1 \leq \Phi N_p L_G K_C \leq 8.2 \quad (1)$$

$$0.005 \leq K_c \leq 0.1 \quad (2)$$

$$55° \leq \theta \leq 80° \quad (3)$$

$$0° \leq \theta_1 \leq 15° \text{ and } 30° \leq \theta_2 \leq 45° \quad (4)$$

in Expressions (1) and (2), $\Phi$ represents a scattering cross section [$m^2$] of the scattering particles, $N_p$ represents a density [pieces/$m^2$] of the scattering particles, $_LG$[m] represents a length extending from the light entrance end to a thickest part of the light guide plate in an entrance direction, and $K_C$ represents a compensation coefficient, in Expression (3), $\theta$ represents the angle formed between the two straight lines of the equal lengths, and in Expression (4), $\theta_1$ represents an angle formed between a perpendicular from a vertex of each of the vertex angles of the plurality of prisms with respect to a bottom of each of the plurality of prisms and one of the straight lines of the different lengths, and $\theta_2$ represents an angle formed between the perpendicular and another of the straight lines of the different lengths.

11. The planar lighting device according to claim 10, wherein each of the light sources comprises one of an LED and a laser diode.

12. A light guide plate made of a transparent resin for converting light of light sources into planar light, comprising:
a light exit plane having a rectangular outer shape;
four light entrance planes which are connected to four sides of the light exit plane and are substantially orthogonal to the light exit plane; and
a quadrangular pyramid backside which is opposed to the light exit plane and includes four inclined planes connected to the four light entrance planes, respectively, and inclined to be farther from the light exit plane toward a center from the four light entrance planes,
wherein a minimum thickness is in the four light entrance planes and a maximum thickness is in the center from the four light entrance planes.

13. The light guide plate according to claim 12, further comprising a number of scattering particles therein, wherein Expressions (1), (2), and (8) below are satisfied, $$1.1 \leq \Phi N_P L_G K_C \leq 8.2 \tag{1}$$

$$0.005 \leq K_C \leq 0.1 \tag{2}$$

$$1 \leq L_a/L_b \leq 2 \tag{8}$$

where $L_a$ represents a length of one side of the light exit plane, $L_b$ represents a length of a side in a direction orthogonal to the one side, $\Phi$ represents a scattering cross section of the scattering particles, $N_P$ represents a density of the scattering particles, $K_C$ represents a compensation coefficient, and $L_G$ represents a length half of longer one of distances in a light entrance direction between opposing two of the four light entrance planes.

14. The light guide plate according to claim 12, wherein each of the four inclined planes is formed flat.

15. The light guide plate according to claim 12, wherein a substantially center of the backside is formed to be curved.

16. The light guide plate according to claim 12, wherein connection parts of the four inclined planes forming the backside is formed of a curved plane.

17. The light guide plate according to claim 12, wherein a ratio of the maximum thickness $D_{max}$ and the minimum thickness $D_{min}$ satisfies Expression (9) below, $$1 < (D\max/D\min) \leq 4 \tag{9}$$

18. A planar lighting device for generating a planar illumination light, comprising:
   a light guide plate being made of a transparent resin; and
   four light sources, each arranged to face the four light entrance planes of the light guide plate,
   wherein said light guide plate for converting light of the four light source into the planar illumination light comprises:
      a light exit plane having a rectangular outer shape;
      four light entrance planes which are connected to four sides of the light exit plane and are substantially orthogonal to the light exit plane; and
      a quadrangular pyramid backside which is opposed to the light exit plane and includes four inclined planes connected to the four light entrance planes, respectively, and inclined to be farther from the light exit plane toward a center from the four light entrance planes, and
   wherein a minimum thickness is in the four light entrance planes and a maximum thickness is in the center from the four light entrance planes.

19. The planar lighting device according to claim 18, wherein the four light sources each include a plurality of white light emitting diodes.

20. The planar lighting device according to claim 19, wherein an emission density of the light emitting diodes is equal to 2.0 [lm/mm$^2$] or more.

21. The planar lighting device according to claim 18, further comprising, in a light exit plane side of the light guide plate, a prism sheet including a plurality of pyramidal prisms regularly arranged on a surface of a sheet made of a transparent resin.

22. The planar lighting device according to claim 21, wherein:
   the prism sheet is disposed so that vertex angles of the a plurality of pyramidal prisms arrayed in parallel with each other face the light exit plane of the light guide plate;
   when lengths of two straight lines sandwiching each of the vertex angles of the plurality of pyramidal prisms of the prism sheet are equal to each other, an angle formed between the two straight lines of the equal lengths satisfies Expression (3) below; and
   when lengths of the two straight lines sandwiching the each of the vertex angles of the plurality of pyramidal prisms are different from each other, an angle formed between the straight lines of the different lengths satisfies Expression (4) below:

$$55° \leq \theta \leq 80° \tag{3}$$

$$0° \leq \theta_1 \leq 15° \text{ and } 30° \leq \theta_2 \leq 45° \tag{4}$$

in Expression (3), $\theta$ represents the angle formed between the two straight lines of the equal lengths, and in Expression (4), $\theta_1$ represents an angle formed between a perpendicular extending from a vertex of each of the vertex angle of the plurality of pyramidal prisms to a bottom of each of the plurality of pyramidal prisms and one of the straight lines of the different lengths, and $\theta_2$ represents an angle formed between the perpendicular and another of the straight lines of the different lengths.

23. A liquid crystal display device, comprising:
   a planar lighting device;
   a liquid crystal display panel disposed on a light exit plane side of the planar lighting device; and
   a drive unit for driving the liquid crystal display panel,
   wherein said planar lighting device comprises:
   a light guide plate assembly; and
   light sources linearly arranged to face the light entrance end of the light guide plate of the light guide plate assembly, and
   wherein said light guide plate assembly comprises:
   a light guide plate which includes a light exit plane for emitting a planar light and a light entrance end disposed in one end of the light exit plane and substantially orthogonal to the light exit plane, is formed into a shape having a thickness in a direction orthogonal to the light exit plane, the thickness being gradually larger as being farther from the light entrance end, and contains scattering particles dispersed therein; and
   a prism sheet which includes a plurality of prisms arrayed in parallel with each other, and is arranged so that vertex angles of the plurality of prisms face the light exit plane of the light guide plate, wherein:
   the scattering particles scatter light entering from the light entrance end and propagating in the light guide plate, which satisfy Expressions (1) and (2) below;
   when lengths of two straight lines sandwiching each of the vertex angles of the plurality of prisms of the prism sheet are equal to each other, an angle formed between the two straight lines of the equal lengths satisfies Expression (3) below; and
   when the lengths of the two straight lines sandwiching the each of the vertex angles of the plurality of prisms are different from each other, an angle formed between the straight lines of the different lengths satisfies Expression (4) below, $$1.1 \leq \Phi N_P L_G K_C \leq 8.2 \tag{1}$$

$$0.005 \leq K_c \leq 0.1 \tag{2}$$

$$55° \leq \theta \leq 80° \tag{3}$$

$$0° \leq \theta_1 \leq 15° \text{ and } 30° \leq \theta_2 \leq 45° \tag{4}$$

in Expressions (1) and (2), $\Phi$ represents a scattering cross section [m$^2$] of the scattering particles, $N_P$ represents a density [pieces/m$^2$] of the scattering particles, $L_G$[m] represents a length extending from the light entrance end to a thickest part of the light guide plate in an entrance direction, and $K_C$ represents a compensation coefficient, in Expression (3), $\theta$ represents the angle formed between the two straight lines of the equal lengths, and in Expression (4), $\theta_1$ represents an angle formed between a perpendicular from a vertex of each of the vertex angles of the plurality of prisms with respect to a bottom of each of the plurality of prisms and one of the straight lines of the different lengths, and $\theta_2$ represents an angle formed between the perpendicular and another of the straight lines of the different lengths.

24. A liquid crystal display device, comprising:
a planar lighting device for generating a planar illumination light;
a liquid crystal display panel disposed on a light exit plane side of the planar lighting device; and
a drive unit for driving the liquid crystal display panel,
wherein said planar lighting device comprises:
a light guide plate being made of a transparent resin; and
four light sources, each arranged to face the four light entrance planes of the light guide plate,
wherein said light guide plate for converting light of the four light source into the planar illumination light comprises:
a light exit plane having a rectangular outer shape;
four light entrance planes which are connected to four sides of the light exit plane and are substantially orthogonal to the light exit plane; and
a quadrangular pyramid backside which is opposed to the light exit plane and includes four inclined planes connected to the four light entrance planes, respectively, and inclined to be farther from the light exit plane toward a center from the four light entrance planes, and
wherein a minimum thickness is in the four light entrance planes and a maximum thickness is in the center from the four light entrance planes.

\* \* \* \* \*